(12) United States Patent
Hotta et al.

(10) Patent No.: US 11,594,783 B2
(45) Date of Patent: Feb. 28, 2023

(54) SEPARATOR, ELECTRODE GROUP, SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yasuyuki Hotta, Tokyo (JP); Hayato Seki, Kawasaki (JP); Kazuomi Yoshima, Yokohama (JP); Shinsuke Matsuno, Tokyo (JP); Norio Takami, Yokohama (JP)

(73) Assignee: KABUSHTKT KAISHA TOSHIBA, Minato-ku (JP)

( * ) Notice: Subject to any disclaimer, the term of this patent is extended or adjusted under 35 U.S.C. 154(b) by 352 days.

(21) Appl. No.: 16/804,489

(22) Filed: Feb. 28, 2020

(65) Prior Publication Data
US 2021/0083251 A1  Mar. 18, 2021

(30) Foreign Application Priority Data
Sep. 13, 2019 (JP) .............................. JP2019-167204

(51) Int. Cl.
| | |
|---|---|
| *H01M 50/431* | (2021.01) |
| *H01M 50/20* | (2021.01) |
| *H01M 4/485* | (2010.01) |
| *H01M 4/66* | (2006.01) |
| *H01M 10/054* | (2010.01) |
| *H01M 10/0562* | (2010.01) |
| *H01M 10/24* | (2006.01) |
| *H01M 10/42* | (2006.01) |

(52) U.S. Cl.
CPC ......... *H01M 50/431* (2021.01); *H01M 4/485* (2013.01); *H01M 4/665* (2013.01); *H01M 10/054* (2013.01); *H01M 10/0562* (2013.01); *H01M 10/24* (2013.01); *H01M 10/425* (2013.01); *H01M 50/20* (2021.01); *H01M 2220/20* (2013.01); *H01M 2300/0002* (2013.01); *H01M 2300/0068* (2013.01); *H01M 2300/0088* (2013.01)

(58) Field of Classification Search
None
See application file for complete search history.

(56) References Cited

U.S. PATENT DOCUMENTS

| | | | |
|---|---|---|---|
| 6,403,253 | B1 | 6/2002 | Wainwright et al. |
| 7,709,140 | B2 | 5/2010 | Hennige et al. |
| 10,079,390 | B2 | 9/2018 | Matsuno et al. |
| 10,461,370 | B2 | 10/2019 | Hotta et al. |
| 10,461,375 | B2 | 10/2019 | Yoshima et al. |
| 2008/0292968 | A1 | 11/2008 | Lee et al. |
| 2013/0302661 | A1* | 11/2013 | Kim ................. H01M 50/414 429/144 |
| 2016/0118640 | A1* | 4/2016 | Miyake ................. G06F 1/163 429/163 |
| 2017/0271717 | A1 | 9/2017 | Yamashita et al. |
| 2018/0269538 | A1 | 9/2018 | Hotta et al. |
| 2018/0277813 | A1 | 9/2018 | Yoshima et al. |
| 2018/0277899 | A1 | 9/2018 | Takami et al. |
| 2019/0089011 | A1 | 3/2019 | Seki et al. |
| 2019/0089012 | A1 | 3/2019 | Hotta et al. |
| 2021/0091358 | A1 | 3/2021 | Uno et al. |
| 2021/0091416 | A1 | 3/2021 | Seki et al. |

FOREIGN PATENT DOCUMENTS

| | | |
|---|---|---|
| CN | 108878751 A | 11/2018 |
| JP | 9-508490 A | 8/1997 |
| JP | 2000-77073 A | 3/2000 |
| JP | 2001-210359 A | 8/2001 |
| JP | 2003-17057 A | 1/2003 |
| JP | 2005-71807 A | 3/2005 |
| JP | 2016-173956 A | 9/2016 |
| JP | 2017-174809 A | 9/2017 |
| JP | 2017-174810 A | 9/2017 |
| JP | 2018-45966 A | 3/2018 |
| JP | 2018-156837 A | 10/2018 |
| JP | 2018-156926 A | 10/2018 |
| JP | 2018-160342 A | 10/2018 |
| JP | 2018-160443 A | 10/2018 |
| JP | 2019-57373 A | 4/2019 |
| JP | 2020-43034 A | 3/2020 |
| JP | 2021-51990 A | 4/2021 |
| JP | 2021-51991 A | 4/2021 |
| WO | WO 2017/135323 A1 | 8/2017 |
| WO | WO 2020/054107 A1 | 3/2020 |

* cited by examiner

OTHER PUBLICATIONS

Liu, S. et. al., "Rechargeable Aqueous Lithium-Ion Battery of $TiO_2/LiMn_2O_4$ with a High Voltage," Journal of The Electrochemical Society, vol. 158, No. 12, 2011, pp. A1490-A1497.

*Primary Examiner* — Anca Eoff
(74) *Attorney, Agent, or Firm* — Oblon, McClelland, Maier & Neustadt, L.L.P.

(57) ABSTRACT

According to one embodiment, a separator is provided. The separator includes a composite membrane. The composite membrane includes a substrate layer, a first composite layer, and a second composite layer. The first composite layer is located on one surface of the substrate layer. The second composite layer is located on the other surface of the substrate layer. The composite membrane has a coefficient of air permeability of $1\times10^{-14}$ m$^2$ or less. The first composite layer has a first surface and a second surface. The first surface is in contact with the substrate layer. The second surface is located on an opposite side to the first surface. Denseness of a portion including the first surface is lower than denseness of a portion including the second surface in the first composite layer.

21 Claims, 8 Drawing Sheets

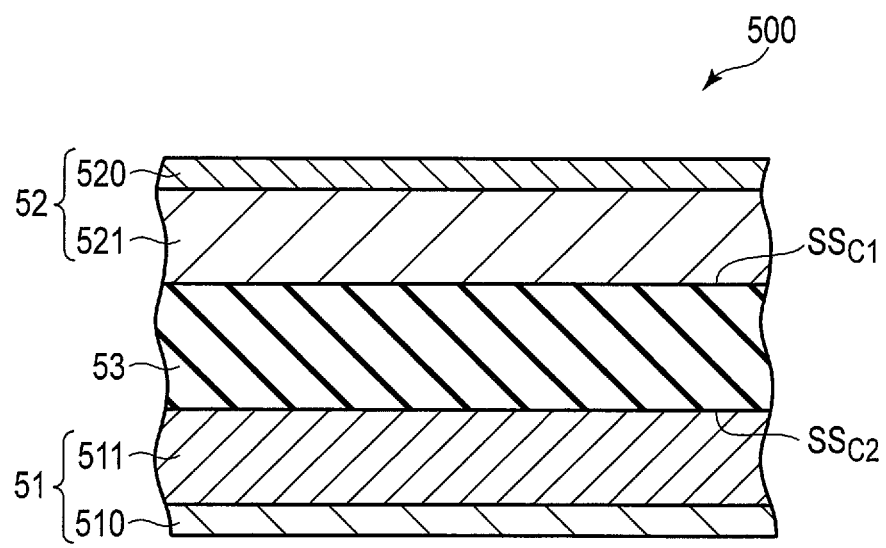
F I G. 3
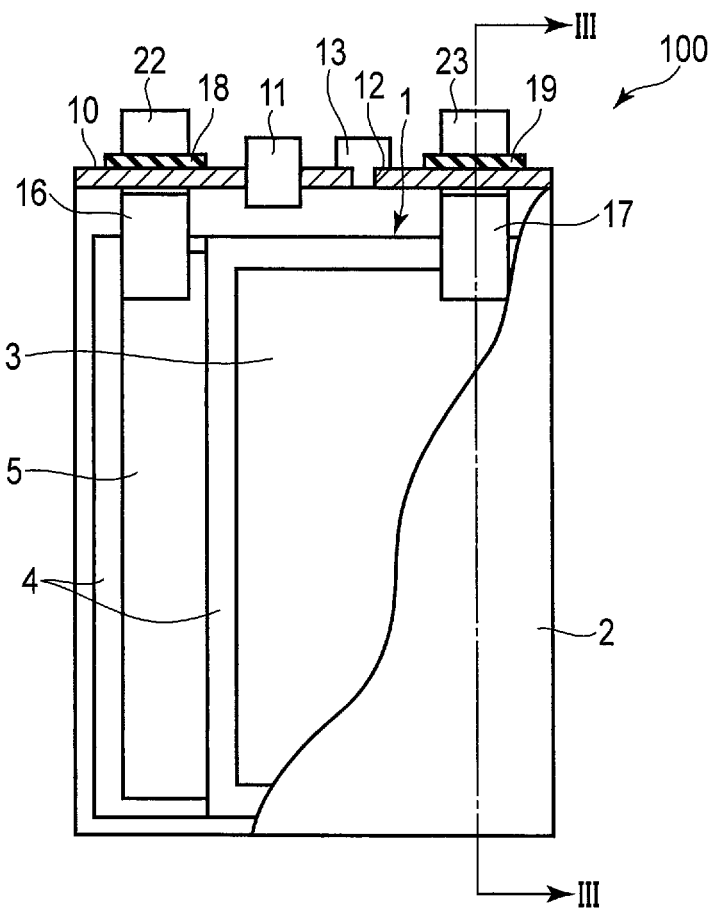
F I G. 4

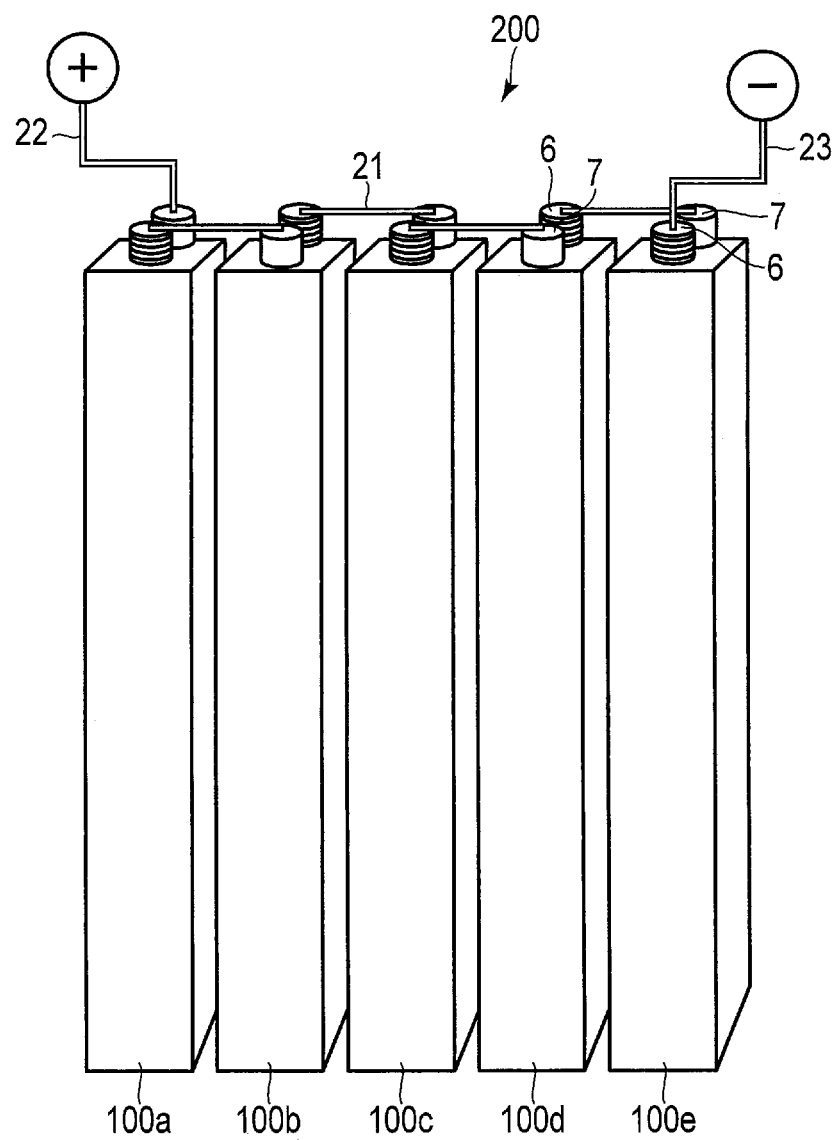
F I G. 8

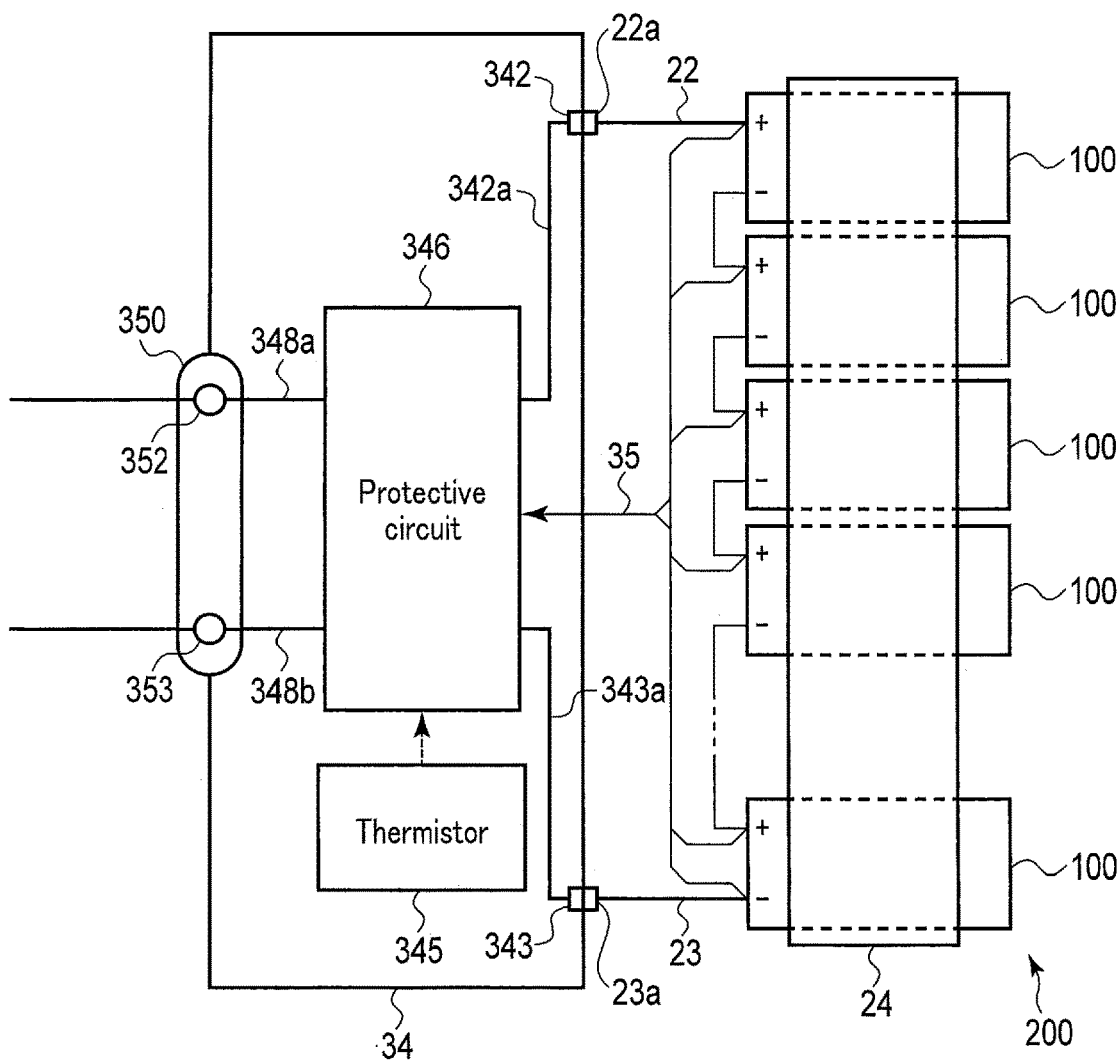
F I G. 10
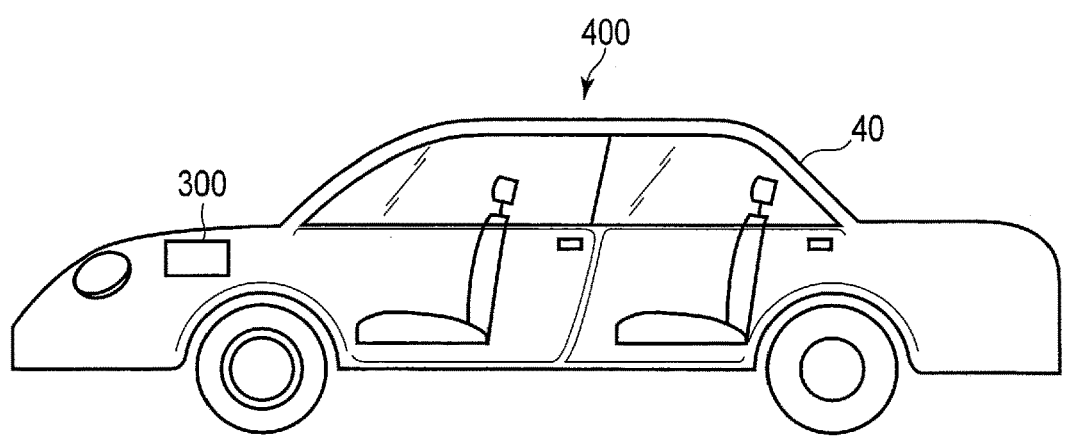
F I G. 11

SEPARATOR, ELECTRODE GROUP, SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2019-167204, filed Sep. 13, 2019, the entire contents of which are incorporated herein by reference.

FIELD

Embodiments described herein relate generally to a separator, an electrode group, a secondary battery, a battery pack, a vehicle, and a stationary power supply.

BACKGROUND

Nonaqueous electrolyte batteries such as lithium ion batteries are used as power sources in a wide range of fields. The forms of nonaqueous electrolyte batteries include many different forms from small ones for various kinds of electronic devices and the like to large ones for electric vehicles and the like. The nonaqueous electrolyte batteries require safety measures since nonaqueous electrolytes containing flammable substances such as ethylene carbonate are used in the batteries.

Development of aqueous electrolyte batteries in which aqueous electrolytes containing nonflammable aqueous solvents are used instead of the nonaqueous electrolytes has been promoted.

BRIEF DESCRIPTION OF THE DRAWINGS

FIG. 3 is a cross-sectional view schematically illustrating an example of an electrode group according to the embodiment;

FIG. 4 is a sectional view schematically showing an example of the secondary battery according to the embodiment;

FIG. 8 is a perspective view schematically showing an example of the battery module according to the embodiment;

FIG. 10 is a block diagram showing an example of an electric circuit of the battery pack shown in FIG. 9;

FIG. 11 is a partial perspective view that schematically illustrates an example of the vehicle according to the embodiment.

DETAILED DESCRIPTION

Figure 1:
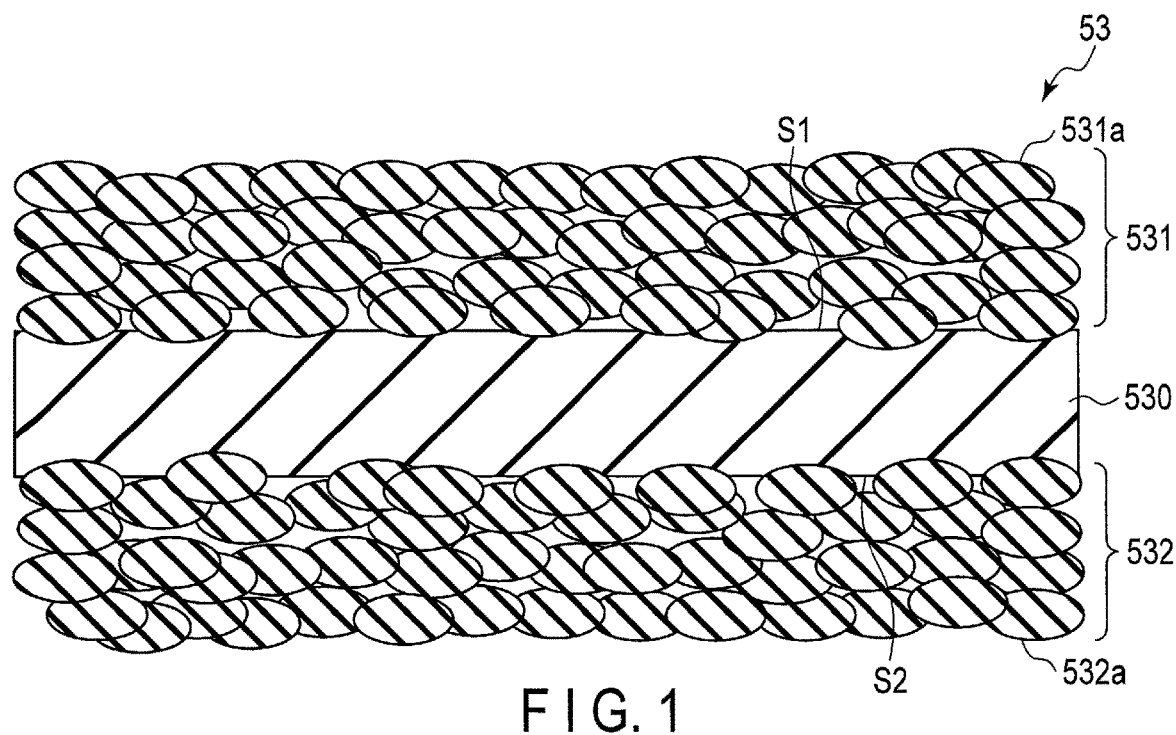
FIG. 1 is a cross-sectional view schematically illustrating an example of a separator according to the embodiment.

According to one embodiment, a separator is provided. The separator includes a composite membrane. The composite membrane includes a substrate layer, a first composite layer, and a second composite layer. The first composite layer is located on one surface of the substrate layer. The second composite layer is located on the other surface of the substrate layer. The composite membrane has a coefficient of air permeability of $1 \times 10^{-14}$ m$^2$ or less. The first composite layer and the second composite layer each includes inorganic solid particles and a polymeric material. The first composite layer has a first surface and a second surface. The first surface is in contact with the substrate layer. The second surface is located on an opposite side to the first surface. Denseness of a portion including the first surface in the first composite layer is lower than denseness of a portion including the second surface in the first composite layer.

According to another embodiment, an electrode group is provided. The electrode group includes a positive electrode, a negative electrode, and the separator according to the embodiment. The positive electrode contains a positive electrode active material. The negative electrode contains a negative electrode active material. The separator is located at least between the positive electrode and the negative electrode.

According to another embodiment, a secondary battery is provided. The secondary battery includes the electrode group according to the embodiment and an aqueous electrolyte.

According to another embodiment, a battery pack is provided. The battery pack includes the secondary battery according to the embodiment.

According to another embodiment, a vehicle is provided. The vehicle includes the battery pack according to the embodiment.

According to another embodiment, a stationary power supply is provided. The stationary power supply includes the battery pack according to the embodiment.

Generally, the potential window of an aqueous electrolyte is narrower than the potential window of a nonaqueous electrolyte. Hence, in aqueous electrolyte batteries, water in the aqueous electrolyte may be electrolyzed during the initial charge depending on the combination of the positive electrode and the negative electrode in some cases. Accordingly, separators used in aqueous electrolyte batteries are required to be dense so that the contact of water with the electrodes is suppressed, that is, high water shielding property is exhibited.

In addition, in each of secondary batteries in which lithium metal or zinc metal are used as the electrodes and secondary batteries in which electrolyte containing lithium ion or zinc ion are used, it is concerned that deposits such as lithium dendrites or zinc dendrites are generated on the electrodes by performing charge and discharge. When these dendrites break through the separator, internal short circuits can occur. The separator is required to be dense from the viewpoint of being hardly broken through by the dendrites as well.

Examples of particularly highly dense separators include solid electrolyte membranes. Solid electrolyte membranes are membranes formed only of solid electrolyte particles having ion conductivity. Solid electrolyte membranes can selectively allow only specific ions to pass through without allowing the solvent to pass through and thus exhibit complete water shielding property. However, solid electrolyte membranes exhibit low flexibility and thus do not exhibit sufficient durability. Moreover, in order to use solid electrolyte membranes as a separator, solid electrolyte membranes are required to have a certain degree or more of thickness and it is thus difficult to increase the energy density of the battery.

In order to solve this problem, a polymer composite membrane in which solid electrolyte particles are bound to each other through a polymeric material has been proposed. The polymer composite membrane does not exhibit complete water shielding property as solid electrolyte membranes do but is highly dense and can be impregnated with a small amount of aqueous electrolyte. Moreover, the polymer composite membrane is superior to the solid electrolyte membrane in flexibility and can also be thinned. However, the present inventors consider that there is room for improvement in the electrolyte impregnating ability of the polymer composite membrane.

First Embodiment

According to one embodiment, a separator is provided. The separator includes a composite membrane. The composite membrane includes a substrate layer, a first composite layer, and a second composite layer. The first composite layer is located on one surface of the substrate layer. The second composite layer is located on the other surface of the substrate layer. The composite membrane has a coefficient of air permeability of $1 \times 10^{-14}$ m$^2$ or less. The first composite layer and the second composite layer each includes inorganic solid particles and a polymeric material. The first composite layer has a first surface and a second surface. The first surface is in contact with the substrate layer. The second surface is located on an opposite side to the first surface. Denseness of a portion including the first surface in the first composite layer is lower than denseness of a portion including the second surface in the first composite layer. The polymeric material can keep the inorganic electrolyte particles together.

The separator according to the embodiment includes a composite layer having different degrees of denseness along the thickness direction from at least one surface. The portion including the second surface in the first composite layer, namely, the surface side portion has a smaller number of voids and is denser than the portion including the first surface, namely, the substrate layer side portion. Hence, the solvent of the electrolyte hardly passes through the separator on the surface side portion and lithium and zinc dendrites hardly break through the separator. On the other hand, on the substrate layer side portion of the first composite layer, a more number of voids are present and thus a more amount of electrolyte can be retained than on the surface side portion. The separator provided with such a first composite layer retains a large amount of electrolyte at the center in the thickness direction including the substrate layer, and the amount of electrolyte retained can be decreased on at least one surface side located in the vicinity of the electrode. In other words, the separator according to the embodiment can exhibit both high denseness and electrolyte impregnating ability.

FIG. 1 is a cross-sectional view schematically illustrating an example of a separator according to the embodiment. The separator illustrated in FIG. 1 includes composite membrane 53. The composite membrane 53 includes a substrate layer 530, a first composite layer 531 provided on one main surface S1 of the substrate layer 530, and a second composite layer 532 provided on the other main surface S2 of the substrate layer 530. The first composite layer 531 and the second composite layer 532 contain inorganic solid particles 531a and 532a, respectively. The first composite layer 531 and the second composite layer 532 are located on the outermost surface of the composite membrane 53.

Figure 2:
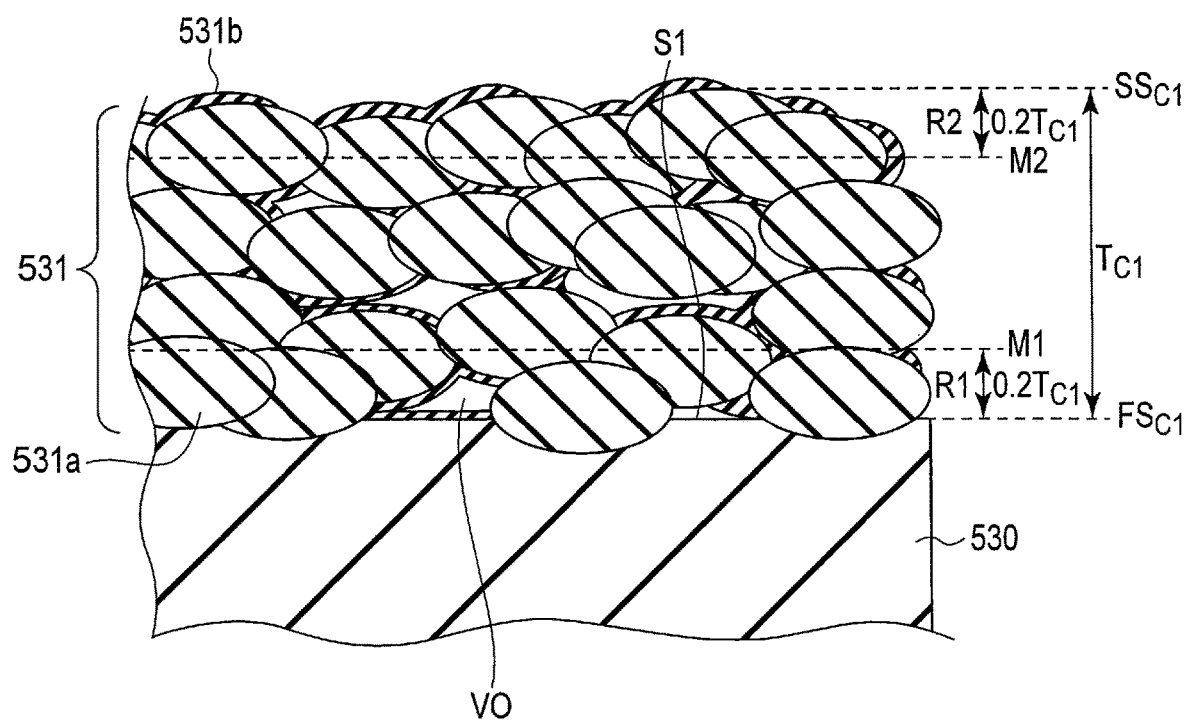
FIG. 2 is a partially enlarged view of the separator illustrated in FIG. 1.

FIG. 2 is a partially enlarged view of the separator illustrated in FIG. 1. As illustrated in FIG. 2, the first composite layer 531 has a first main surface $FS_{C1}$ in contact with a main surface S1 of the substrate layer 530 and a second main surface $SS_{C1}$ located on the opposite side to the first main surface $FS_{C1}$. The length from the first main surface $FS_{C1}$ to the second main surface $SS_{C1}$ is a thickness $T_{C1}$ of the first composite layer 531. In the first composite layer 531, the inorganic solid particles 531a are bound to each other through a polymeric material 531b. The first composite layer 531 is provided with holes VO which do not include any of the inorganic solid particles 531a and the polymeric material 531b. The holes VO are provided in a greater number on the first main surface $FS_{C1}$ side on the inner side in contact with the substrate layer 530 than on the second main surface $SS_{C1}$ side which is the front surface. The first composite layer 531 may have a structure in which the denseness gradually decreases from the surface side toward the substrate layer 530 side or may have a two-layer structure of the surface side and the substrate layer 530 side. A surface roughness Ra of the first composite layer 531 on the side in contact with the electrode is preferably 0.05 μm or more and 1 μm or less. A more preferred range thereof is from 0.1 μm or more and 0.3 μm or less.

In the first composite layer 531, a ratio $SD_{C1}/FD_{C1}$ of a second density $SD_{C1}$ to a first density $FD_{C1}$ is preferably 1.03 or more. The first density $FD_{C1}$ is a proportion occupied by a portion other than the holes VO in a region from the first surface $FS_{C1}$ to a first surface M1 located at a depth of 0.2 $T_{C1}$ with respect to a thickness $T_{C1}$ of the first composite layer 531. The second density $SD_{C1}$ is a proportion occupied by a portion other than the holes VO in a region from the second surface $SS_{C1}$ to a second surface M2 located at a depth of 0.2 $T_{C1}$ with respect to a thickness $T_{C1}$ of the first composite layer 531. The portion other than the holes VO is typically a portion in which the inorganic solid particles 531a and the polymeric material 531b are present.

It can be said that the denseness on the substrate layer 530 side and the surface side of the first composite layer 531 are respectively higher as the first density $FD_{C1}$ and the second density $SD_{C1}$ are higher. Moreover, it can be said that the denseness on the surface side of the first composite layer 531 is higher than on the substrate layer 530 side as the ratio $SD_{C1}/FD_{C1}$ is higher. The ratio $SD_{C1}/FD_{C1}$ is preferably 1.03 or more. There is no particular upper limit of the ratio $SD_{C1}/FD_{C1}$, but the upper limit is 2.00 or less according to an example.

Separators having a low first density $FD_{C1}$ tend to have high electrolyte impregnating ability. The first density $FD_{C1}$ is preferably 97 or less and more preferably 95 or less. On the other hand, separators having a high first density $FD_{C1}$ tend to be highly dense. The first density $FD_{C1}$ is preferably 50 or more, more preferably 70 or more, and still more preferably 90 or more.

Separators having a low second density $SD_{C1}$ tend to exhibit high ion conductivity. The second density $SD_{C1}$ is preferably 99 or less and more preferably 98 or less. Separators having a high second density $SD_{C1}$ tend to be highly dense. The second density $SD_{C1}$ is preferably 80 or more, more preferably 90 or more, and still more preferably 95 or more.

The first density $FD_{C1}$ and the second density $SD_{C1}$ are measured, for example, by the following methods. First, the secondary battery is disassembled and the separator is collected. A part of the collected separator is cut out, washed, and dried to obtain a test piece. The test piece is cut out in a direction parallel to the thickness direction by argon milling to obtain a cross section. The cross section obtained is, for example, as illustrated in FIG. This cross section is observed under a scanning electron microscope (SEM), the first main surface $FS_{C1}$ and second main surface $SS_{C1}$ of the first composite layer 531 are determined, and the thickness $T_{C1}$ of the first composite layer 531 is measured.

The first main surface $FS_{C1}$ and second main surface $SS_{C1}$ of the first composite layer 531 are respectively surfaces parallel to a direction orthogonal to the thickness direction of the composite membrane 53 and surfaces located at the outermost surface. At this time, the first main surface $FS_{C1}$ and the second main surface $SS_{C1}$ have convex portions in the cross section in some cases. This is because a part of the first composite layer 531 enters inside the substrate layer 530 in some cases in the case of the convex portion of the first main surface $FS_{C1}$. This is because aggregates of inorganic solid particles are present in the separator in some cases in the case of the convex portion of the second main surface $SS_{C1}$. In this case, a portion in the parallel direction to the direction orthogonal to the thickness direction of the composite membrane 53 except this convex portion is taken as the first main surface $FS_{C1}$. In addition, on the second main surface $SS_{C1}$ as well, a portion in the parallel direction to the direction orthogonal to the thickness direction of the composite membrane 53 except the convex portion is taken as the second main surface $SS_{C1}$ similarly to the first main surface $FS_{C1}$.

Next, the image of the region R1 illustrated in FIG. 2 is cut out from the image of the cross section. The image of the cross section is acquired by SEM observation at a magnification of 5000-fold. The region R1 is a region from the first main surface $FS_{C1}$ to the first surface M1 in the first composite layer 531. The first surface M1 is a surface located between the first main surface $FS_{C1}$ and the second main surface $SS_{C1}$ and at a depth of $0.2 T_{C1}$ with respect to the thickness $T_{C1}$ of the first composite layer 531 from the first main surface $FS_{C1}$. In other words, the region R1 is located at the end on the substrate layer 530 side in the cross section of the first composite layer 531 and is a region occupying 20% of the area of the first composite layer 531 on the substrate layer 530 side.

Next, the image of the region R2 illustrated in FIG. 2 is cut out from the image of the cross section. The image of the cross section is acquired by SEM observation at a magnification of 5000-fold. The region R2 is a region R2 from the second main surface $SS_{C1}$ to the second surface M2. The second surface M2 is a surface located between the second main surface $SS_{C1}$ and the first main surface $FS_{C1}$ and at a depth of $0.2 T_{C1}$ with respect to the thickness $T_{C1}$ of the first composite layer 531 from the second main surface $SS_{C1}$. In other words, the region R2 is located at the end on the front surface side, namely, on the second main surface $SS_{C1}$ side in the cross section of the first composite layer 531 and is a region occupying 20% of the area of the first composite layer 531 on the surface side.

Next, the brightness of the images of the regions R1 and R2 is normalized. These normalized images are subjected to binarization so that a hole portion and a portion (hereinafter referred to as a filling portion) other than the hole portion are distinguished from each other. The proportion occupied by the filling portion in the image of the region R1 subjected to the binarization is calculated, and this is taken as the first density $FD_{C1}$. The proportion occupied by the filling portion in the image of the region R2 subjected to the binarization is similarly calculated, and this is taken as the second density $SD_{C1}$.

Next, details of the separator according to the embodiment will be described.

The substrate layer is a porous layer having a greater number of voids than the first and second composite layers and can be impregnated with a large amount of electrolyte. The substrate layer typically does not contain inorganic solid particles. For example, the proportion of the area of the inorganic solid particles in the cross section of the substrate layer is 5% or less.

The substrate layer is, for example, a nonwoven fabric or a self-supporting porous film. As materials for the nonwoven fabric or the self-supporting porous film, for example, polyethylene (PE), polypropylene (PP), cellulose, or polyvinylidene fluoride (PVdF) is used. The substrate layer is preferably a nonwoven fabric formed of cellulose.

The thickness of the substrate layer is, for example, 1 μm or more and preferably 3 μm or more. When the substrate is thick, the mechanical strength of the separator increases and the internal short circuit of the secondary battery is less likely to occur. The thickness of the substrate layer is, for example, 30 μm or less and preferably 10 μm or less. When the substrate layer is thin, the internal resistance of the secondary battery tends to decrease and the volume energy density of the secondary battery tends to increase. The thickness of the substrate layer can be measured using, for example, a scanning electron microscope.

Examples of the inorganic solid particles contained in the first and second composite layers include oxide-based ceramics such as alumina, silica, zirconia, yttria, magnesium oxide, calcium oxide, barium oxide, strontium oxide, and vanadium oxide, carbonates and sulfates such as sodium carbonate, potassium carbonate, magnesium carbonate, calcium carbonate, barium carbonate, lanthanum carbonate, cerium carbonate, calcium sulfate, magnesium sulfate, aluminum sulfate, gypsum, and barium sulfate, phosphates such as hydroxyapatite, lithium phosphate, zirconium phosphate, and titanium phosphate, and nitride-based ceramics such as silicon nitride, titanium nitride, and boron nitride. The inorganic particles mentioned above may be in the form of a hydrate.

It is preferable that the inorganic solid particles exhibit ion conductivity of alkali metal ions. Examples of the inorganic solid particles exhibiting lithium ion conductivity include an oxide-based solid electrolyte or a sulfide-based solid electrolyte. The oxide-based solid electrolyte is preferably a lithium phosphoric acid solid electrolyte which has a Sodium (Na) Super Ionic Conductor (NASICON) type structure and which is represented by a general formula of $LiM_2(PO_4)_3$. M in the above-described general formula is, for example, at least one element selected from the group consisting of: titanium (Ti); germanium (Ge); strontium (Sr); zirconium (Zr); tin (Sn); aluminum (Al); and calcium (Ca). The lithium phosphoric acid solid electrolyte represented by the general formula of $LiM_2(PO_4)_3$ has an ionic conductivity of, for example, $1 \times 10^{-5}$ S/cm to $1 \times 10^{-3}$ S/cm.

Specific examples of the lithium phosphoric acid solid electrolyte having NASICON type structure include LATP ($Li_{1+x+y}Al_x$(Ti and/or Ge$)_{2-x}Si_yP_{3-y}O_{12}$ where $0<x\leq2$, $0\leq y<3$, $Li_{1+x}Al_xGe_{2-x}(PO_4)_3$ where $0\leq x\leq2$, and $Li_{1+x}Al_x$ $Zr_{2-x}(PO_4)_3$ where $0 \leq x \leq 2$, $Li_{1+2x}Zr_{1-x}Ca_x(PO_4)_3$ where $0 \leq x < 1$. $Li_{1+2x}Zr_{1-x}Ca_x(PO_4)_3$ is preferably used as inorganic solid electrolyte particles because of its high water-resistance and low reducing ability and its low cost.

In addition to the above lithium phosphoric acid solid electrolyte, examples of the oxide-base solid electrolyte include amorphous LIPON ($Li_{2.9}PO_{3.3}N_{0.46}$), and $La_{5+x}A_xLa_{3-x}M_2O_{12}$ where A is at least one selected from the group consisting of Ca, Sr, and Ba, and M is at least one of Nb and Ta, $Li_3M_{2-x}L_2O_{12}$ where M is at least one of Ta and Nb, and L is Zr, $Li_{7-3x}Al_xLa_3Zr_3O_{12}$, and LLZ ($Li_7La_3Zr_2O_{12}$) having a garnet-type structure. One kind of the solid electrolyte or a mixture of two or more kinds thereof may be used. LIPON has an ionic conductivity of, for example, $1 \times 10^{-6}$ S/cm to $5 \times 10^{-6}$ S/cm. LLZ has an ionic conductivity of, for example, $1 \times 10^{-4}$ S/cm to $5 \times 10^{-4}$ S/cm.

Further, as the solid electrolyte particles, sodium-containing solid electrolyte can be used. The sodium-containing solid electrolyte has an excellent sodium ion conductivity. Examples of the sodium-containing solid electrolyte include β-alumina, sodium phosphate sulfide, sodium phosphate oxide, and the like. The sodium ion-containing solid electrolyte is preferably in the form of glass-ceramic.

The inorganic solid particles are preferably a solid electrolyte having a lithium ion conductivity of $1 \times 10^{-5}$ S/cm or more at 25° C. The lithium ion conductivity can be measured by, for example, the alternating-current impedance method. To be more specific, first, the inorganic solid particles are molded by using a tablet making machine, thereby a pressed powder body is obtained. Both surfaces of this pressed powder body are gold (Au)-evaporated, thereby a measurement sample is obtained. The alternating-current impedance of the measurement sample is measured by using an impedance measurement instrument. As the measurement instrument, Solartron model 1260 Frequency Response Analyzer may be used, for example. The measurement is performed over a measurement frequency range of 5 Hz to 32 MHz at a temperature of 25° C. under argon atmosphere.

Subsequently, based on the measured alternating-current impedance, a complex impedance plot is prepared. The complex impedance plot involves plotting an imaginary component on a vertical axis and a real component on a horizontal axis. Ionic conductivity $\sigma_{Li}$ of the inorganic solid particles is calculated by the following equation. In the following equation, $Z_{Li}$ is a resistance calculated from a diameter of an arc of the complex impedance plot, S is an area, and d is a thickness.

$$\sigma_{Li} = (1/Z_{Li}) \times (d/S) \qquad \text{[Equation 1]}$$

The inorganic solid particles are not limited to be in a particular shape, but can be in the form of, for example, spheres, ellipses, flats, fibers, or the like.

The average particle size of the inorganic solid particles is preferably 15 μm or less, and is more preferably 12 μm or less. When the inorganic solid particles have a smaller average particle size, the first and second composite layers can have high compactness.

The average particle size of the inorganic solid particles is preferably 0.01 μm or more, and is more preferably 0.1 μm or more. When the inorganic solid particles have a large average particle size, aggregation of the particles tends to be suppressed.

The average particle size of the inorganic solid particles refers to a particle size at which a cumulative volume is 50% in a particle-size distribution obtained by a laser diffraction particle size analyzer. As a sample for this particle size analysis, a dispersion solution having the inorganic solid particles diluted with ethanol in a concentration of 0.01 mass % to 5 mass % is used.

The inorganic solid particles contained in the first and second composite layers may be the same as each other, or different kinds of inorganic solid particles may be used. In addition, a single kind of inorganic solid particles may be used or plural kinds of inorganic solid particles may be used in mixture.

In the first and second composite layers, the inorganic solid particles are preferably the main component. The proportion of the inorganic solid particles in the first and second composite layers is preferably 70% by mass or more, more preferably 80% by mass or more, and still more preferably 85% by mass or more from the viewpoint of enhancing the ion conductivity of the first and second composite layers.

The proportion of the inorganic solid particles in the first and second composite layers is preferably 98% by mass or less, more preferably 95% by mass or less, and still more preferably 90% by mass or less from the viewpoint of increasing the membrane strength of the first and second composite layers. The proportion of the inorganic solid particles in the first and second composite layers can be calculated by thermogravimetric (TG) analysis.

The polymeric material contained in the first and second composite layers enhances the binding property between the inorganic solid particles. The weight-average molecular weight of the polymeric material is, for example, 3,000 or more. When the weight-average molecular weight of the polymeric material is 3,000 or more, the binding property of the inorganic solid particles can be further enhanced. The weight-average molecular weight of the polymeric material is preferably 3,000 to 5,000,000, more preferably 5,000 to 2,000,000, and much more preferably 10,000 to 1,000,000. The weight-average molecular weight of the polymeric material can be obtained by gel permeation chromatography (GPC).

The polymeric material can be a polymer made of a single monomer unit, a copolymer made of a plurality of monomer units, or a mixture thereof. The polymeric material preferably contains a monomer unit constituted by a hydrocarbon with a functional group including one type or two or more types of elements selected from the group consisting of oxygen (O), sulfur (S), nitrogen (N), and fluorine (F). In the polymeric material, the ratio of a portion formed from the monomer unit is preferably 70 mol % or more. The monomer unit will be referred to as a first monomer unit hereinafter. Additionally, in a copolymer, a monomer unit other than the first monomer unit will be referred to as a second monomer unit. The copolymer of the first monomer unit and the second monomer unit may be an alternating copolymer, a random copolymer, or a block copolymer.

When the proportion occupied by the portion formed of the first monomer unit in the polymeric material is lower than 70 mol %, it is concerned that the water shielding property of the first and second composite layers decreases. The ratio of the portion formed from the first monomer unit in the polymeric material is preferably 90 mol % or more. More preferably, the ratio of the portion formed from the first monomer unit in the polymeric material is preferably 100 mol %, that is, the polymeric material is a polymer formed from only the first monomer unit.

The first monomer unit may be a compound whose side chain has a functional group including one type or two or more types of elements selected from the group consisting of oxygen (O), sulfur (S), nitrogen (N), and fluorine (F) and whose main chain is formed from a carbon-to-carbon bond. The hydrocarbon may have one type or two or more types of functional groups each including one type or two or more types of elements selected from the group consisting of oxygen (O), sulfur (S), nitrogen (N), and fluorine (F). The functional group in the first monomer unit enhances the conductivity of alkali metal ions passing through the first and second composite layers.

The hydrocarbon that forms the first monomer unit preferably has a functional group including at least one element selected from the group consisting of oxygen (O), sulfur (S), and nitrogen (N). When the first monomer unit has such a functional group, the conductivity of alkali metal ions in the first and second composite layers tends to be further enhanced and the internal resistance tends to decrease.

The functional group contained in the first monomer unit is preferably at least one functional group selected from the group consisting of a formal group, a butyral group, a carbonylmethyl ester group, an acetyl group, a carbonyl group, a hydroxy group, and a fluoro group. In addition, the first monomer unit preferably contains at least one of a carbonyl group and a hydroxy group in a functional group, and more preferably contains both of them.

The first monomer unit can be represented by the following formula.

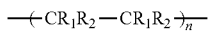

In the formula, $R_1$ is preferably selected for the group consisting of hydrogen (H), an alkyl group, and an amino group. In addition, $R_2$ is preferably selected from the group consisting of a hydroxy group (—OH), —OR$_1$, —COOR$_1$, —OCOR$_1$, —OCH(R$_1$)O—, —CN, —N(R$_1$)$_3$, and —SO$_2$R$_1$.

Examples of the first monomer unit include at least one or two or more selected from the group consisting of vinyl formal, vinyl alcohol, vinyl acetate, vinyl acetal, vinyl butyral, acrylic acid and derivatives thereof, methacrylic acid and derivatives thereof, acrylonitrile, acrylamide and derivatives thereof, styrene sulfonic acid, polyvinylidene fluoride, and tetrafluoroethylene.

The polymeric material preferably contains at least one selected from the group consisting of polyvinyl formal, polyvinyl alcohol, polyvinyl acetal, polyvinyl butyral, polymethyl methacrylate, polyvinylidene fluoride, and polytetrafluoroethylene.

Examples of structural formulas of compounds usable as the polymeric material will be described below.

The structural formula of polyvinyl formal is as follows. In the formula, preferably, a is 50 to 80, b is 0 to 5, and c is 15 to 50.

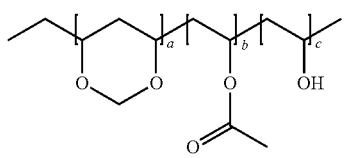

The structural formula of polyvinyl butyral is as follows. In the formula, preferably, l is 50 to 80, m is 0 to 10, and n is 10 to 50.

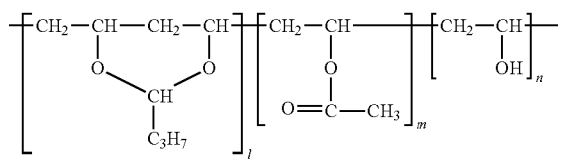

The structural formula of polyvinyl alcohol is as follows. In the formula, preferably, n is 70 to 20,000.

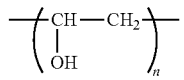

The structural formula of polymethyl methacrylate is as follows. In the formula, preferably, n is 30 to 10,000.

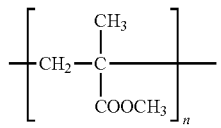

The second monomer unit is a compound other than the first monomer unit, that is, a hydrocarbon that does not have a functional group including one type or two or more types of elements selected from the group consisting of oxygen (O), sulfur (S), nitrogen (N), and fluorine (F), or a material that has the functional group but is not a hydrocarbon. Examples of the second monomer unit are ethylene oxide and styrene can be used. Examples of a polymer formed from the second monomer unit are polyethylene oxide (PEO) and polystyrene (PS).

The types of the functional groups contained in the first monomer unit and the second monomer unit can be identified by infrared spectroscopy (Fourier Transform Infrared Spectroscopy: FT-IR). Whether the first monomer unit is formed from a hydrocarbon can be determined by nuclear magnetic resonance (NMR). In the copolymer of the first monomer unit and the second monomer unit, the ratio of the portion formed from the first monomer unit can be calculated by NMR.

The polymeric material can contain an aqueous electrolyte. The ratio of the aqueous electrolyte that the polymeric material may contain can be grasped based on the water absorption capacity. Here, the water absorption capacity of the polymeric material is given by ([M1−M]/M×100) that is a value obtained by dividing a value obtained by subtracting a mass M of the polymeric material before immersion from a mass M1 of the polymeric material after it is immersed in water at a temperature of 23° C. for 24 hrs by the mass M of the polymeric material before immersion. The water absorption capacity of the polymeric material is considered to be associated with the polarity of the polymeric material.

When a polymeric material having a high coefficient of water absorption capacity is used, the alkali metal ion conductivity of the first and second composite layers tends to be enhanced. In addition, when a polymeric material having a high coefficient of water absorption capacity is used, the binding force between the inorganic solid particles and the polymeric material increases and the flexibility of the first and second composite layers can be enhanced. The water absorption capacity of the polymeric material is preferably 0.01% or more, more preferably 0.5% or more, and much more preferably 2% or more.

When a polymeric material having a low coefficient of water absorption capacity is used, the strength of the first and second composite layers increases. In other words, when the coefficient of water absorption capacity of the polymeric material is too high, the first and second composite layers swell with the aqueous electrolyte in some cases. In addition, when the coefficient of water absorption capacity of the polymeric material is too high, the polymeric material in the first and second composite layers flows into the aqueous electrolyte. The water absorption capacity of the polymeric material is preferably 15% or less, more preferably 10% or less, much more preferably 7% or less, and particularly preferably 3% or less.

The proportion of the polymeric material in the first and second composite layers is preferably 1% by mass or more, more preferably 3% by mass or more, and still more preferably 10% by mass or more from the viewpoint of enhancing the flexibility of the first and second composite layers.

In addition, the proportion of the polymeric material in the first and second composite layers is preferably 20% by mass or less, more preferably 10% by mass or less, and still more preferably 5% by mass or less from the viewpoint of enhancing the lithium ion conductivity of the first and second composite layers. The proportion of the polymeric material in the first and second composite layers can be calculated by thermogravimetric (TG) analysis.

The polymeric material contained in the first and second composite layers may be the same as each other, or different kinds of polymeric materials may be used. In addition, a single kind of polymeric material may be used or plural kinds of polymeric materials may be used in mixture.

The first and second composite layers may contain a plasticizer and an electrolyte salt in addition to the inorganic solid particles and the polymeric material. For example, when the first and second composite layers contain an electrolyte salt, the alkali metal ion conductivity of the separator can be further enhanced.

The thicknesses $T_{C1}$ and $T_{C2}$ of the first and second composite layers are preferably 3 μm or more, more preferably 5 μm or more, and still more preferably 7 μm or more from the viewpoint that an internal short circuit hardly occurs.

In addition, the thicknesses $T_{C1}$ and $T_{C2}$ of the first and second composite layers are preferably 50 μm or less, more preferably 30 μm or less, and still more preferably 20 μm or less from the viewpoint of enhancing the ion conductivity and the energy density.

The thicknesses $T_{C1}$ and $T_{C2}$ of the first and second composite layers may be the same as or different from each other. In a case in which the thicknesses are different from each other, it is more preferable that the composite layer disposed on the negative electrode side is thicker. It is preferable that the composite layer disposed on the negative electrode side is thicker since the water shielding property can be enhanced. The thickness $T_{C2}$ of the second composite layer can be measured by a method similar to that for the thickness $T_{C1}$ of the first composite layer.

The second composite layer may have a configuration the same as or different from that of the first composite layer. The second composite layer may have a structure with a great number of voids on the substrate layer side along the thickness direction similarly to the first composite layer. In other words, the denseness on the first main surface $FS_{C2}$ side of the second composite layer in contact with the main surface on the opposite side to the main surface on which the first composite layer is provided in the substrate layer may be lower than the denseness on the second main surface $SS_{C2}$ side located on the opposite side to the first main surface $FS_{C2}$. When the second composite layer has such a structure, denseness can be enhanced on both surfaces of the composite membrane and the electrolyte impregnating ability at the center in the thickness direction can be enhanced.

The ratio $SD_{C2}/FD_{C2}$ of the second density $SD_{C2}$ to the first density $FD_{C2}$ is preferably 1.03 or more. The first density $FD_{C2}$ of the second composite layer is a proportion occupied by a portion other than holes in a region from the first main surface $FS_{C2}$ to the first surface located at a depth of 0.2 $T_{C2}$ with respect to the thickness $T_{C2}$ of the second composite layer. The second density $SD_{C2}$ of the second composite layer is a proportion occupied by a portion other than holes in a region from the second main surface $SS_{C2}$ to the second surface located at a depth of 0.2 $T_{C2}$ with respect to the thickness $T_{02}$ of the second composite layer. The first density $FD_{C2}$ and the second density $SD_{C2}$ can be calculated by a similar method to that for the first density $FD_{C1}$ and second density $SD_{C1}$ of the first composite layer.

The second composite layer may uniformly have voids in the thickness direction. In other words, the ratio $SD_{C2}/FD_{C2}$ may be 1.00. The internal resistance of the secondary battery can be further decreased by disposing the first composite layer exhibiting higher denseness, for example, on the negative electrode side on which high water shielding property is required and disposing the second composite layer exhibiting low denseness but high electrolyte impregnating ability, for example, on the positive electrode side on which high water shielding property is not required.

The coefficient of air permeability of the composite membrane is $1 \times 10^{-14}$ m$^2$ or less. It can be said that a composite membrane having a low coefficient of air permeability is highly dense and exhibits high water shielding property. The coefficient of air permeability of the composite membrane is preferably $1 \times 10^{-15}$ m$^2$ or less and still more preferably $1 \times 10^{-16}$ m$^2$ or less. There is no particular lower limit value of the coefficient of air permeability of the composite membrane, but the lower limit value is $1 \times 10^{-19}$ m$^2$ or more according to an example.

Here, the coefficient of air permeability (m$^2$) of the composite membrane is calculated as follows. In the calculation of the coefficient of air permeability KT, a gas having a coefficient of viscosity σ (Pa·s) is allowed to pass through the range of the measurement area A (m$^2$), for example, in a case in which a composite membrane having a thickness L (m) is the measurement target. At this time, the gas is allowed to pass through under a plurality of conditions in which the pressures p (Pa) of the gases to be introduced are different from each other, the gas amount Q (m$^3$/s) passed through the composite membrane is measured under each of the plurality of conditions. Thereafter, the gas amount Q with respect to the pressure p is plotted from the measurement results to determine dQ/dp, which is the slope. Thereafter, the coefficient of air permeability KT is calculated as in Equation (2) from the thickness L, the measurement area A, the coefficient of viscosity σ, and the slope dQ/dp.

[Formula 2]

$$KT = ((\sigma \cdot 1)/A) \times (dQ/dp) \quad (2)$$

In an example of the method for calculating the coefficient of air permeability KT, a composite membrane is sandwiched between a pair of stainless steel plates each equipped with a hole having a diameter of 10 mm. Thereafter, air is sent through the hole of one stainless steel plate at a pressure p. Thereafter, the gas amount Q of the air leaking through the hole of the other stainless steel plate is measured. Hence, the area of the hole ($25\pi$ mm$^2$) is used as the measurement area A, and 0.000018 Pa·s is used as the coefficient of viscosity σ. Moreover, the gas amount Q is calculated by measuring the amount δ (m$^3$) leaking through the hole during 100 seconds and dividing the measured amount δ by 100.

Thereafter, the gas amount Q with respect to the pressure p is measured at four points at which the pressure p is apart from each other at least by 1000 Pa in the manner described above. For example, the gas amount Q with respect to the pressure p is measured at each of four points at which the pressure p is 1000 Pa, 2500 Pa, 4000 Pa, and 6000 Pa. Thereafter, the gas amount Q with respect to the pressure p at the four measured points is plotted and the slope (dQ/dp) of the gas amount Q with respect to the pressure p is calculated by straight line fitting (least squares method). Thereafter, the coefficient of air permeability KT is calculated by multiplying the calculated slope (dQ/dp) by (σ·L)/A.

Incidentally, in the measurement of the coefficient of air permeability of the composite membrane, the battery is disassembled and the composite membrane is separated from other parts of the battery. After both surfaces of the composite membrane is washed with pure water, the composite membrane is immersed in pure water and left to stand for 48 hours or more. Thereafter, both surfaces are further washed with pure water and dried in a vacuum drying furnace at 100° C. for 48 hours or more, and then the composite membrane is subjected to the measurement of coefficient of air permeability. Moreover, the coefficient of air permeability is measured at arbitrary plural places of the composite membrane. Thereafter, a value at a place at which the coefficient of air permeability is the lowest value among the arbitrary plural places is taken as the coefficient of air permeability of the composite membrane.

Next, a method for manufacturing the separator according to the embodiment will be described.

First, a slurry for forming the first composite layer is prepared. The slurry for first composite layer formation is obtained by stirring a mixture obtained by mixing inorganic solid particles, a polymeric material, and a solvent.

As the solvent, a solvent capable of dissolving a polymeric material is preferably used. Examples of the solvent include alcohols such as ethanol, methanol, isopropyl alcohol, normal propyl alcohol and benzyl alcohol, ketones such as acetone, methyl ethyl ketone, methyl isobutyl ketone, cyclohexanone and diacetone alcohol, esters such as ethyl acetate, methyl acetate, butyl acetate, ethyl lactate, methyl lactate and butyl lactate, ethers such as methyl cellosolve, ethyl cellosolve, butyl cellosolve, 1,4-dioxane and tetrahydrofuran, glycols such as ethylene glycol monoethyl ether acetate, propylene glycol monomethyl ether acetate, butyl carbitol acetate, and ethyl carbitol acetate, glycol ethers such as methyl carbitol, ethyl carbitol, and butyl carbitol, aprotic polar solvents such as dimethylformamide, dimethylacetamide, acetonitrile, valeronitrile, N-methyl-2-pyrrolidone, N-ethyl-2-pyrrolidone and γ-butyrolactam, cyclic carboxylic acid esters such as gamma-butyrolactone, gamma-valerorolactone, gamma-caprolactone and epsilon-caprolactone, and chain carbonate compounds such as dimethyl carbonate, diethyl carbonate, di-n-propyl carbonate, diisopropyl carbonate, n-propyl isopropyl carbonate, ethyl methyl carbonate, and methyl n-propyl carbonate.

Next, the slurry for first composite layer formation is applied on, for example, one main surface of a substrate layer such as a cellulose-based nonwoven fabric by, for example, a doctor blade method to obtain a coating film. This coating film is dried at a temperature of 50° C. or more and 150° C. or less.

Next, a slurry for forming the second composite layer is prepared. The slurry for second composite layer formation is obtained by a similar method to that for preparing the slurry for first composite layer formation. The slurry for first composite layer formation may be used as the slurry for second composite layer formation. The slurry for second composite layer formation is applied on the other main surface of the substrate layer by, for example, a doctor blade method to obtain a coating film. This coating film is dried at a temperature of 50° C. or more and 150° C. or less. A laminate in which dried coating films are provided on both surfaces of the substrate layer is thus obtained.

Next, this laminate is subjected to a roll press treatment. At the time of the roll press treatment, a press apparatus equipped with two rollers up and down is used so that the coating films on both surfaces of the laminate are simultaneously roll-pressed. At this time, the heating temperature of the roller in contact with the coating film on one main surface is set to a temperature within the softening point of the polymeric material in the coating film±20° C. By subjecting the coating film to the roll press treatment at a temperature close to the softening point of the polymeric material, only the polymeric material located on the surface side of the coating film is heated and softened. In addition, the polymeric material located on the substrate layer side of the coating film can be extruded to the surface side as the coating film is pressed. Hence, the softened polymeric material is disposed so as to fill the gap between the inorganic solid particles on the surface side of the coating film and the denseness is enhanced as compared with that on the inner side of the coating film. In this manner, a first composite layer of which the denseness on the surface side is different from that on the inner side (substrate side) can be obtained.

The heating temperature of the roller in contact with the coating film on the other main surface can be appropriately changed depending on the desired structure. For example, in a case in which the coating film on the other main surface is roll-pressed at normal temperature of 25° C., the polymeric material is not softened, and a second composite layer exhibiting uniform denseness along the thickness direction of the coating film can be thus obtained. In addition, in a case in which the coating film is subjected to the roll press treatment at a temperature close to the softening point of the polymeric material, a second composite layer in which the denseness on the surface side of the coating film is higher than the denseness on the inner side can be obtained similarly to the first composite layer. The heating temperature of the roller is preferably lower than the melting point of the polymeric material. When the heating temperature is raised to a temperature equal to or more than the melting point of the polymeric material, the polymeric material melts on the surface side of the coating film and the voids may be completely lost. This is because the ion conductivity of the second composite layer decreases when the voids are completely lost.

The softening point and melting point of the polymeric material can vary depending on the molecular weight and the unit ratio of monomer. According to an example, the softening point of PVdF is 135° C. or more and 145° C. or less and the melting point thereof is 170° C. or more and 180° C. or less. The softening point of polyvinyl formal is 120° C. or more and 130° C. or less and the melting point thereof is 190° C. or more and 200° C. or less. The softening point of polyvinyl butyral is 120° C. or more and 130° C. or less and the melting point thereof is 190° C. or more and 200° C. or less.

In the manner described above, a separator equipped with a composite membrane including a substrate layer, a first composite layer, and a second composite layer is obtained. Here, the method for simultaneously subjecting the coating films provided on both surfaces of the substrate layer to a roll press treatment has been described, but the coating films may be subjected to the roll press treatment one by one.

Alternatively, the first composite layer may be provided by applying two kinds of slurries so as to form a two-layer structure. In other words, for example, a slurry having a high proportion of inorganic solid particles and a low proportion of polymeric material is prepared as a slurry for forming a lower layer which is located on the substrate layer side of the first composite layer and exhibits low denseness. This slurry for lower layer formation is applied on one main surface of the substrate layer and dried to obtain a coating film. Next, for example, a slurry having a low proportion of inorganic solid particles and a high proportion of polymeric material is prepared as a slurry for forming an upper layer which is located on the surface side of the first composite layer and exhibits high denseness. This slurry for upper layer formation is applied on the coating film on one main surface of the substrate layer and dried to further provide a coating film. Next, the slurry for second composite layer formation is applied on the other main surface of the substrate layer and dried to obtain a coating film. The second composite layer may have a two-layer structure similarly to the first composite layer or may not have a two-layer structure. A laminate in which dried coating films are provided on both surfaces of the substrate layer is thus obtained. Thereafter, the laminate is pressed at, for example, normal temperature (25° C.) using a press apparatus equipped with two rollers up and down to obtain a first composite layer of which the denseness on the surface side is different from that on the inner side. Incidentally, the heating temperature of the roller on the first composite layer side may be set to a temperature close to the softening point of the polymeric material.

The separator according to the embodiment described above includes a first composite layer of which the denseness on the surface side is higher than the denseness on the porous side. For this reason, this separator exhibits excellent electrolyte impregnating ability.

Second Embodiment

According to an embodiment, an electrode group is provided. The electrode group includes a positive electrode containing a positive electrode active material, a negative electrode containing a negative electrode active material, and the separator according to the embodiment. The separator is located at least between the positive electrode and the negative electrode.

The positive electrode can include a current collector and a positive electrode active material-containing layer provided on at least one main surface of the current collector. The positive electrode active material-containing layer contains a positive electrode active material and arbitrarily a conductive agent and a binder.

The negative electrode can include a current collector and a negative electrode active material-containing layer provided on at least one main surface of the current collector. The negative electrode active material-containing layer contains a negative electrode active material and arbitrarily a conductive agent and a binder.

FIG. 3 is a cross-sectional view schematically illustrating an example of an electrode group according to the embodiment. An electrode group 500 illustrated in FIG. 3 includes a positive electrode 51, a negative electrode 52, and a separator located between the positive electrode 51 and the negative electrode 52. The positive electrode 51 includes a positive electrode current collector 510 and a positive electrode active material-containing layer 511 supported on one main surface of the positive electrode current collector 510. The negative electrode 52 includes a negative electrode current collector 520 and a negative electrode active material-containing layer 521 supported on one main surface of the negative electrode current collector 520. The separator is the composite membrane 53 illustrated in FIG. 1 and FIG. 2. The second main surface $SS_{C1}$ of the first composite layer 531 included in the composite membrane 53 is in contact with the main surface of the negative electrode active material-containing layer 521 of the negative electrode 52. The second main surface $SS_{C2}$ of the second composite layer 532 included in the separator is in contact with the main surface of the positive electrode active material-containing layer 511 of the positive electrode 51.

The electrode group according to the embodiment can be particularly suitably used as an electrode group for aqueous electrolyte battery in a case in which a compound having a lithium ion insertion/extraction potential of 1 V or more and 3 V or less (vs. $Li/Li^+$) as a potential based on metal lithium is used as the negative electrode active material. The reason for this will be described below.

In an aqueous electrolyte battery including a negative electrode containing a compound having a lithium ion insertion/extraction potential in the above range in the negative electrode active material, water contained in the solvent of the aqueous electrolyte can be electrolyzed inside and in the vicinity of the negative electrode at the time of the initial charge. This is because the potential of the negative electrode decreases as lithium ions are stored in the negative electrode active material at the time of the initial charge. When the negative electrode potential decreases to be lower than the hydrogen generation potential, a part of water is decomposed into hydrogen ($H_2$) and hydroxide ion ($OH^-$) inside and in the vicinity of the negative electrode. As a result, the pH of the aqueous electrolyte present inside and in the vicinity of the negative electrode thus increases.

The hydrogen generation potential of the negative electrode depends on the pH of the aqueous electrolyte. In other words, the hydrogen generation potential of the negative electrode decreases when the pH of the aqueous electrolyte in contact with the negative electrode increases. In a battery containing a negative electrode active material in which the lower limit value of the lithium ion insertion/extraction potential is 1 V or more (vs. $Li/Li^+$) is used, the potential of the negative electrode is lower than the hydrogen generation potential at the time of the initial charge, but the potential of the negative electrode is likely to be higher than the hydrogen generation potential after the initial charge, and thus the decomposition of water in the negative electrode is less likely to occur.

When such a negative electrode is used in combination with a separator exhibiting excellent water shielding property on the surface side in contact with the negative electrode, the contact of the negative electrode with the aqueous electrolyte can be suppressed, and thus a high pH of the aqueous electrolyte present in the negative electrode and in the vicinity of the negative electrode after the initial charge can be maintained. In addition, the separator according to the embodiment exhibits excellent electrolyte retaining property at the center located apart from the negative electrode and can thus enhance the ion conductivity between the negative electrode and the positive electrode. Hence, a secondary battery having a high capacity and excellent stability can be realized when the separator according to the embodiment is combined with a negative electrode active material in which the lower limit value of the lithium ion insertion/extraction potential is 1 V or more (vs. Li/Li$^+$).

Examples of the compound having a lithium ion insertion/extraction potential of 1 V or more and 3 V or less (vs. Li/Li$^+$) as a potential based on metal lithium include titanium oxide and a titanium-containing oxide. Examples of the titanium-containing oxide include lithium titanium composite oxide, niobium titanium composite oxide, and sodium niobium titanium composite oxide. The negative electrode active material can contain one or two or more of titanium oxide and titanium-containing oxides.

The titanium oxide includes, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ ($0 \leq x \leq 1$). In addition, the structure of titanium oxide having a monoclinic structure before charge can be expressed as $TiO_2(B)$.

The lithium titanium composite oxide includes, for example, a lithium titanium composite oxide having a spinel structure (for example, the general formula is $Li_{4+x}Ti_5O_{12}$ ($-1 \leq x \leq 3$)), a lithium titanium composite oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$), and the like. The lithium titanium composite oxide may be a lithium titanium composite oxide in which a dopant is introduced.

The niobium titanium composite oxides include, for example, a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

The sodium niobium titanium oxides include, for example, an orthorhombic Na-containing niobium titanium composite oxide represented by the general formula $Li_{2-v}Na_{2-w}M1_xTi_{6-y-z}Nb_yM2_zO_{14+\delta}$ ($0 \leq v \leq 4$, $0 \leq w < 2$, $0 \leq x < 2$, $0 < y < 6$, $0 \leq z < 3$, $-0.5 \leq \delta \leq 0.5$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al).

As the negative electrode active material, the titanium oxide having the anatase structure, the titanium oxide having the monoclinic structure, the lithium titanium composite oxide having the spinel structure, or a mixture thereof is preferably used. When one of these oxides is used as the negative electrode active material and a lithium manganese composite oxide is used as the positive electrode active material, a high electromotive force can be obtained.

The negative electrode active material is contained in the negative electrode active material-containing layer in a form of, for example, particles. The negative electrode active material particles can be primary particles, secondary particles as the aggregates of primary particles, or a mixture of single primary particles and secondary particles. The shape of a particle is not particularly limited and can be, for example, spherical, elliptical, flat, or fibrous.

The secondary particles of the negative electrode active material can be obtained by, for example, the following method. First, the raw materials of the active material are reactively synthesized to produce an active material precursor having an average particle size of 1 μm or less. After that, a calcination treatment is performed for the active material precursor, and a grinding treatment is performed using a grinder such as a ball mill or a jet mill. Next, in a calcination treatment, the active material precursor is agglomerated to grow secondary particles with a larger particle size.

The average particle size (diameter) of the secondary particles of the negative electrode active material is preferably 3 μm or more, and more preferably 5 μm to 20 μm. Within this range, since the surface area of the active material is small, decomposition of water can further be suppressed.

The average particle size of the primary particles of the negative electrode active material is preferably 1 μm or less. This shortens the diffusion distance of Li ions in the active material and increases the specific surface area. For this reason, excellent high input performance (rapid charge) can be obtained. On the other hand, if the average particle size of the primary particles of the negative electrode active material is small, agglomeration of the particles readily occurs. If agglomeration of the particles of the negative electrode active material occurs, the aqueous electrolyte is readily unevenly distributed on the negative electrode side in the secondary battery, and the ionic species may be exhausted in the positive electrode. For this reason, the average particle size of the primary particles of the negative electrode active material is preferably 0.001 μm or more. The average particle size of the primary particles of the negative electrode active material is more preferably 0.1 μm to 0.8 μm.

Note that each of the primary particle size and the secondary particle size means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the negative electrode active material particles by N-methyl-2-pyrrolidone such that the concentration becomes 0.1 mass % to 1 mass % is used. Alternatively, a measurement sample obtained by dispersing 0.1 g of a negative electrode active material in 1 to 2 ml of distilled water containing a surfactant is used.

The specific surface area of the negative electrode active material in the BET method by nitrogen ($N_2$) adsorption falls within the range of, for example, 3 m$^2$/g to 200 m$^2$/g. If the specific surface area of the negative electrode active material falls within this range, the affinity between the negative electrode and the aqueous electrolyte can be made higher. The specific surface area can be obtained by, for example, the same method as that for the specific surface area of the negative electrode active material-containing layer.

As the material of the negative electrode current collector, a substance that is electrochemically stable in the negative electrode potential range when the alkali metal ions are inserted or extracted is used. The negative electrode current collector is preferably, for example, an aluminum foil or an aluminum alloy foil containing at least one element selected from the group consisting of magnesium (Mg), titanium (Ti), zinc (Zn), manganese (Mn) iron (Fe), copper (Cu), and silicon (Si). The negative electrode current collector may have another form such as a porous body or a mesh. The thickness of the negative electrode current collector is preferably 5 µm to 20 µm. A current collector having such a thickness can balance the strength of the electrode and weight reduction.

The porosity of the negative electrode active material-containing layer is preferably set to 20% to 50%. This makes it possible to obtain a negative electrode having good affinity for the aqueous electrolyte and having a high density. The porosity of the negative electrode active material-containing layer is more preferably 25% to 40%.

The porosity of the negative electrode active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio of the total pore amount and the volume of the active material-containing layer.

The specific surface area of the negative electrode active material-containing layer in the BET method by nitrogen ($N_2$) adsorption is more preferably 3 $m^2/g$ to 50 $m^2/g$. If the specific surface area of the negative electrode active material-containing layer is less than 3 $m^2/g$, the affinity between the negative electrode active material and the aqueous electrolyte may lower. As a result, the interface resistance of the negative electrode increases, and the output characteristic and the charge-and-discharge cycle characteristic may lower. On the other hand, if the specific surface area of the negative electrode active material-containing layer exceeds 50 $m^2/g$, an ionic species ionized from the electrolyte salt may be unevenly distributed on the negative electrode side, resulting in a shortage of an ionic species ionized from the electrolyte salt in the positive electrode. Hence, the output characteristic and the charge-and-discharge cycle characteristic may lower.

The specific surface area can be obtained by, for example, the following method. First, the secondary battery is disassembled, and a part of the negative electrode active material-containing layer is extracted. Next, the nitrogen gas adsorption amount (mL/g) of the sample is measured at each pressure P while a nitrogen gas pressure P (mmHg) is gradually increased in nitrogen gas at 77 K (boiling point of nitrogen). Then, an adsorption isotherm is obtained by plotting the adsorption amount of nitrogen gas with respect to each relative pressure $P/P_0$. The relative pressure $P/P_0$ is obtained by dividing the pressure P (mmHg) by a saturated vapor pressure $P_0$ (mmHg) of nitrogen gas. Then, a BET plot is calculated from the nitrogen adsorption isotherm and the BET equation, and a specific surface area is obtained using the BET plot. For the calculation of the BET plot, a BET multipoint method is used.

The negative electrode active material-containing layer may contain a conductive agent, a binder, and the like in addition to the negative electrode active material.

The conductive agent is mixed as needed to raise current collection performance and suppress the contact resistance between the active material and the current collector. Examples of the conductive agent include carbonaceous materials such as acetylene black, Ketjen black, graphite, and coke. The conductive agent may be of one type, or two or more types may be used in mixture.

The binder has a function of binding the active material, the conductive agent, and the current collector. As the binder, at least one material selected from the group consisting of, for example, polytetrafluoroethylene (PTFE), polyvinylidene fluoride (PVdF), a cellulose-based polymer such as carboxymethylcellulose (CMC), fluorine-based rubber, styrene-butadiene rubber, an acrylic resin or a copolymer thereof, polyacrylic acid, and polyacrylonitrile can be used. The binder is not limited to these materials. The binder may be of one type, or two or more types may be used in mixture.

The mixing ratios of the negative electrode active material, the conductive agent, and the binder in the negative electrode active material-containing layer are preferably 70 mass % to 95 mass %, 3 mass % to 20 mass %, and 2 mass % to 10 mass %, respectively. If the mixing ratio of the conductive agent is 3 mass % or more, the conductivity of the negative electrode can be improved. If the mixing ratio of the conductive agent is 20 mass % or less, decomposition of the aqueous electrolyte on the conductive agent surface can be reduced. If the mixing ratio of the binder is 2 mass % or more, a sufficient electrode strength can be obtained. If the mixing ratio of the binder is 10 mass % or less, the insulating portion of the electrode can be decreased.

The negative electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

The positive electrode can include a positive electrode current collector and a positive electrode active material-containing layer supported on the positive electrode current collector.

The positive electrode current collector is made of, for example, a metal such as stainless steel, aluminum (Al), or titanium (Ti). The positive electrode current collector has a form of, for example, a foil, a porous body, or a mesh. To prevent corrosion by the reaction between the positive electrode current collector and the aqueous electrolyte, the surface of the positive electrode current collector may be covered with a different kind of element. The positive electrode current collector is preferably made of a material with excellent corrosion resistance and oxidation resistance, for example, a Ti foil. Note that when $Li_2SO_4$ is used as the aqueous electrolyte, Al may be used as the positive electrode current collector because corrosion does not progress.

The positive electrode active material-containing layer contains the positive electrode active material. The positive electrode active material-containing layer may be supported on each main surface of the positive electrode current collector.

As the positive electrode active material, a compound whose lithium ion insertion/extraction potential is 2.5 V (vs. Li/Li$^+$) to 5.5 V (vs. Li/Li$^+$) as a potential based on metal lithium can be used. The positive electrode may contain one type of positive electrode active material or may contain two or more types of positive electrode active materials.

Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ (0<x≤1), $Li_xMnPO_4$ (0<x≤1)), and the like. The phosphate compound having an olivine crystal structure has excellent thermal stability.

Examples of the positive electrode active material capable of obtaining a high positive electrode potential are a lithium manganese composite oxide having a spinel structure such as $Li_xMn_2O_4$ (0<x≤1) or $Li_xMnO_2$ (0<x≤1), a lithium nickel aluminum composite oxide such as $Li_xNi_{1-y}Al_yO_2$ (0<x≤1, and 0<y<1), a lithium cobalt composite oxide such as $Li_xCoO_2$ (0<x≤1), a lithium nickel cobalt composite oxide such as $Li_xNi_{1-y-z}Co_yMn_zO_2$ (0<x≤1, 0<y<1, and 0≤z<1), a lithium manganese cobalt composite oxide such as $Li_xMn_yCo_{1-y}O_2$ (0<x≤1, and 0<y<1), a spinel type lithium manganese nickel composite oxide such as $Li_xMn_{1-y}Ni_yO_4$ (0<x≤1, 0<y<2, and 0<1-y<1), a lithium phosphorus oxide such as having an olivine structure such as $Li_xFePO_4$ (0<x≤1), $Li_xFe_{1-y}Mn_yPO_4$ (0<x≤1, 0≤y≤1), or $Li_xCoPO_4$ (0<x≤1), and a fluorinated iron sulfate (for example, $Li_xFeSO_4F$ (0<x≤1)).

The positive electrode active material is preferably at least one material selected from the group consisting of a lithium cobalt composite oxide, a lithium manganese composite oxide, and a lithium phosphorus oxide having an olivine structure. The operating potentials of these active materials are 3.5 V (vs. Li/Li$^+$) to 4.2 V (vs. Li/Li$^+$). That is, the operating potentials of these active materials are relatively high. When these positive electrode active materials are used in combination with the above-described negative electrode active material such as a spinel type lithium titanate or an anatase type titanium oxide, a high battery voltage can be obtained.

The positive electrode active material is contained in the positive electrode in a form of, for example, particles. The positive electrode active material particles can be single primary particles, secondary particles as the aggregates of primary particles, or a mixture of primary particles and secondary particles. The shape of a particle is not particularly limited and can be, for example, spherical, elliptical, flat, or fibrous.

The average particle size (diameter) of the primary particles of the positive electrode active material is preferably 10 μm or less, and more preferably 0.1 μm to 5 μm. The average particle size (diameter) of the secondary particles of the positive electrode active material is preferably 100 μm or less, and more preferably 10 μm to 50 μm. The primary particle size and the secondary particle size of the positive electrode active material can be measured by the same method as that for the negative electrode active material particles.

The positive electrode active material-containing layer may contain a conductive agent, a binder, and the like in addition to the positive electrode active material.

The conductive agent is mixed as needed to raise current collection performance and suppress the contact resistance between the active material and the current collector. Examples of the conductive agent include carbonaceous materials such as acetylene black, Ketjen black, graphite, and coke. The conductive agent may be of one type, or two or more types may be used in mixture.

As the binder, for example, polytetrafluoroethylene (PTFE), polyvinylidene fluoride (PVdF), fluorine-based rubber, ethylene-butadiene rubber, polypropylene (PP), polyethylene (PE), carboxymethylcellulose (CMC), polyimide (PI), polyacrylimide (PAI), or the like can be used. The binder may be of one type, or two or more types may be used in mixture.

The mixing ratios of the positive electrode active material, the conductive agent, and the binder in the positive electrode active material-containing layer are preferably 70 mass % to 95 mass %, 3 mass % to 20 mass %, and 2 mass % to 10 mass %, respectively. If the mixing ratio of the conductive agent is 3 mass % or more, the conductivity of the positive electrode can be improved. If the mixing ratio of the conductive agent is 20 mass % or less, decomposition of the aqueous electrolyte on the conductive agent surface can be reduced. If the mixing ratio of the binder is 2 mass % or more, a sufficient electrode strength can be obtained. If the mixing ratio of the binder is 10 mass % or less, the insulating portion of the electrode can be decreased.

The positive electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

The electrode group according to the embodiment includes the separator according to the embodiment. Hence, the electrode group according to the embodiment has an excellent electrolyte impregnating ability.

Third Embodiment

According to an embodiment, a secondary battery including the electrode group according to the embodiment and an aqueous electrolyte is provided. The aqueous electrolyte can be retained in the electrode group.

Moreover, the secondary battery according to the embodiment can further include a container for housing the electrode group and the electrolyte.

Furthermore, the secondary battery according to the embodiment can further include a negative electrode terminal electrically connected to the negative electrode and a positive electrode terminal electrically connected to the positive electrode.

The secondary battery according to the embodiment can be, for example, a lithium ion secondary battery. Moreover, the secondary battery includes an aqueous electrolyte secondary battery containing an aqueous electrolyte.

The aqueous electrolyte contains an aqueous solvent and an electrolyte salt. The aqueous electrolyte may be a liquid. A liquid aqueous electrolyte is prepared by dissolving the electrolyte salt serving as a solute in the aqueous solvent.

As the electrolyte salt, for example, a lithium salt, a sodium salt, or a mixture thereof is used. One type or two or more types of electrolyte salts can be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI: $LiN(SO_2CF_3)_2$), lithium bis(fluorosulfonyl)imide (LiFSI: $LiN(SO_2F)_2$), lithium bis(oxalate)borate (LiBOB: $LiB[(OCO)_2]_2$), or the like can be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like can be used.

As the lithium salt, LiCl is preferably contained. When LiCl is used, the lithium ion concentration of the aqueous electrolyte can be made high. Additionally, the lithium salt preferably contains at least one of $LiSO_4$ and LiOH in addition to LiCl.

In addition, zinc salts such as zinc chloride and zinc sulfate may be added to the electrolytic solution other than a lithium salt. By adding such a compound to the electrolytic solution, a zinc-containing coating layer and/or a zinc oxide-containing region can be formed in the negative electrode.

The mol concentration of lithium ions in the aqueous electrolyte is preferably 3 mol/L or more, more preferably 6 mol/L or more, and much more preferably 12 mol/L or more. When the concentration of the lithium ions in the aqueous electrolyte is high, electrolysis of the aqueous solvent in the negative electrode can easily be suppressed, and hydrogen generation from the negative electrode tends to be little.

In the aqueous electrolyte, the aqueous solvent amount is preferably 1 mol or more relative to 1 mol of the salt serving as a solute. In a more preferable form, the aqueous solvent amount relative to 1 mol of the salt serving as a solute is 3.5 mol or more.

The aqueous electrolyte preferably contains, as an anion species, at least one anion species selected from the group consisting of a chloride ion ($Cl^-$), a hydroxide ion ($OH^-$), a sulphate ion ($SO_4^{2-}$), and a nitrate ion ($NO_3^-$).

The pH of the aqueous electrolyte is preferably 3 to 14, and more preferably 4 to 13.

In addition, the pH of the aqueous electrolyte on the negative electrode side and that on the positive electrode side are preferably different after the initial charge. In the secondary battery after the initial charge, the pH of the aqueous electrolyte on the negative electrode side is preferably 3 or more, more preferably 5 or more, and much more preferably 7 or more. In the secondary battery after the initial charge, the pH of the aqueous electrolyte on the positive electrode side preferably falls within the range of 0 to 7, and more preferably falls within the range of 0 to 6.

The pHs of the aqueous electrolyte on the negative electrode side and the positive electrode side can be obtained by, for example, disassembling the secondary battery and measuring the pH of the aqueous electrolyte existing between the separator and the negative electrode and the pH of the aqueous electrolyte existing between the separator and the positive electrode.

As the aqueous solvent, a solution containing water can be used. Here the solution containing water may be pure water or a solvent mixture of water and an organic solvent.

The aqueous electrolyte may be a gel electrolyte. The gel electrolyte is prepared by mixing the above-described liquid aqueous electrolyte and a high-molecular compound and compounding them. As the high-molecular compound, for example, polyvinylidene fluoride (PVdF), polyacrylonitrile (PAN), polyethylene oxide (PEO), and the like can be used.

Whether the aqueous electrolyte contains water can be confirmed by GC-MS (Gas Chromatography-Mass Spectrometry). In addition, the salt concentration and water content in the aqueous electrolyte can be measured by, for example, ICP (Inductively Coupled Plasma) emission spectrometry. A predetermined amount of aqueous electrolyte is measured, and the concentrate of the contained salt is calculated, thereby calculating the mol concentration (mol/L). In addition, when the specific gravity of the aqueous electrolyte is measured, the number of moles in each of the solute and the solvent can be calculated.

As the container that stores the positive electrode, the negative electrode, and the aqueous electrolyte, a metal container, a laminated film container, or a resin container can be used.

As the metal container, a metal can made of nickel, iron, stainless steel, or the like and having a rectangular shape or a cylindrical shape can be used. As the resin container, a container made of polyethylene, polypropylene, or the like can be used.

The board thickness of each of the resin container and the metal container preferably falls within the range of 0.05 mm to 1 mm. The board thickness is more preferably 0.5 mm or less, and much more preferably 0.3 mm or less.

As the laminated film, for example, a multilayered film formed by covering a metal layer with a resin layer can be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) can be used. The thickness of the laminated film preferably falls within the range of 0.01 mm to 0.5 mm. The thickness of the laminated film is more preferably 0.2 mm or less.

The secondary battery according to this embodiment can be used in various forms such as a rectangular shape, a cylindrical shape, a flat type, a thin type, and a coin type. In addition, the secondary battery may be a secondary battery having a bipolar structure. The secondary battery having a bipolar structure is advantageous in producing a plurality of serial cells by one cell.

Details of the secondary battery according to the embodiment will be described below with reference to FIGS. 4, 5, 6, and 7.

Figure 5:
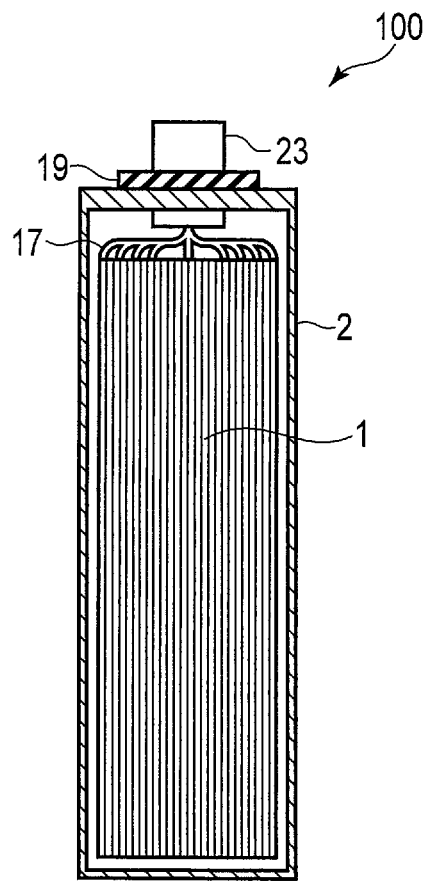
FIG. 5 is a sectional view of the secondary battery shown in FIG. 4 taken along a line III-III.

FIG. 4 is a sectional view schematically showing an example of the secondary battery according to the embodiment. FIG. 5 is a sectional view of the secondary battery shown in FIG. 4 taken along a line III-III.

An electrode group 1 is stored in a rectangular tubular metal container 2. The electrode group 1 has a structure formed by spirally winding a positive electrode 5 and a negative electrode 3 with a separator 4 interposing therebetween so as to form a flat shape. An aqueous electrolyte (not shown) is held by the electrode group 1. As shown in FIG. 4, a strip-shaped positive electrode side lead 22 is electrically connected to each of a plurality of portions at an end of the positive electrode 5 located on an end face of the electrode group 1. In addition, a strip-shaped negative electrode side lead 23 is electrically connected to each of a plurality of portions at an end of the negative electrode 3 located on the end face. The plurality of positive electrode side leads 22 are electrically connected to a positive electrode tab 16 in a bundled state. A positive electrode terminal is formed from the positive electrode side leads 22 and the positive electrode tab 16. In addition, the negative electrode side leads 23 are electrically connected to a negative electrode tab 17 in a bundled state. A negative electrode terminal is formed from the negative electrode side leads 23 and the negative electrode tab 17. A sealing plate 10 made of a metal is fixed to the opening portion of the metal container 2 by welding or the like. The positive electrode tab 16 and the negative electrode tab 17 are extracted to the outside from outlet holes provided in the sealing plate 10, respectively. The inner surface of each outlet hole of the sealing plate 10 is coated with an insulating member to avoid a short circuit caused by contact between the positive electrode tab 16 and the negative electrode tab 17.

As shown in FIG. 5, the other end of the negative electrode tab 17 has a strip shape and is electrically connected to each of a plurality of portions of the negative electrode 3 located on the upper end face of the electrode group 1. Although not illustrated, similarly, the other end of the positive electrode tab 16 has a strip shape and is electrically connected to each of a plurality of portions of the positive electrode 5 located on the upper end face of the electrode group 1.

Referring to FIG. 4, the sealing plate 10 made of a metal is fixed to the opening portion of the metal container 2 by welding or the like. The positive electrode side leads 22 and the negative electrode side leads 23 are extracted to the outside from outlet holes provided in the sealing plate 10, respectively. On the inner surfaces of the outlet holes of the sealing plate 10, positive electrode gaskets 18 and negative electrode gaskets 19 are arranged to avoid a short circuit caused by contact between the positive electrode side leads 22 and the negative electrode side leads 23. When the positive electrode gaskets 18 and the negative electrode gaskets 19 are arranged, the airtightness of the rectangular secondary battery 100 can be maintained.

A control valve 11 (safety valve) is arranged in the sealing plate 10. If the internal pressure of the battery cell is raised by a gas generated by electrolysis of the aqueous solvent, the generated gas can be released from the control valve 11 to the outside. As the control valve 11, for example, a return type valve that operates when the internal pressure exceeds a set value and functions as a sealing plug when the internal pressure lowers can be used. Alternatively, a non-return type valve that cannot recover the function as a sealing plug once it operates can be used. In FIG. 4, the control valve 11 is arranged at the center of the sealing plate 10. However, the position of the control valve 11 may be an end of the sealing plate 10. The control valve 11 may be omitted.

Additionally, a liquid pouring port 12 is provided in the sealing plate 10. The aqueous electrolyte can be poured via the liquid pouring port 12. The liquid pouring port 12 can be closed by a sealing plug 13 after the aqueous electrolyte is poured. The liquid pouring port 12 and the sealing plug 13 may be omitted.

Figure 6:
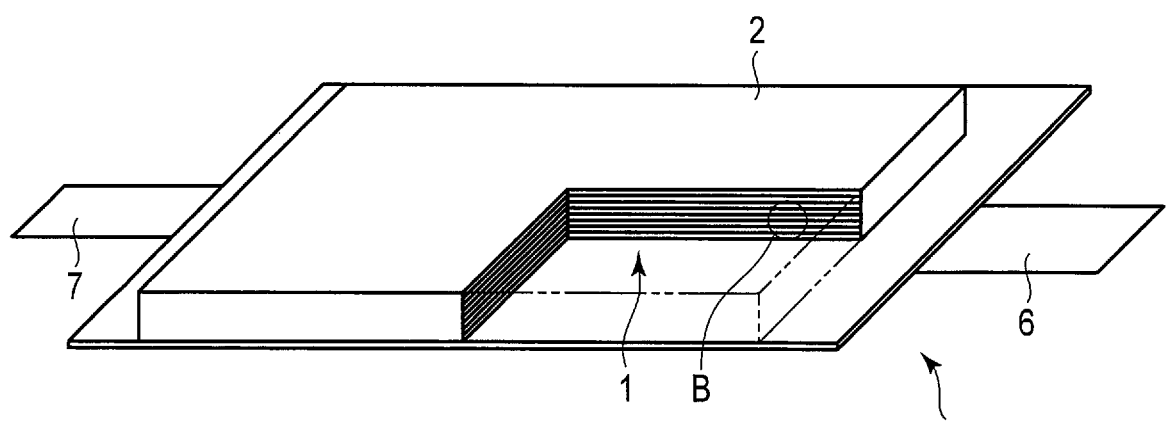
FIG. 6 is a partially cut-out perspective view schematically showing another example of a secondary battery according to the embodiment.
Figure 7:
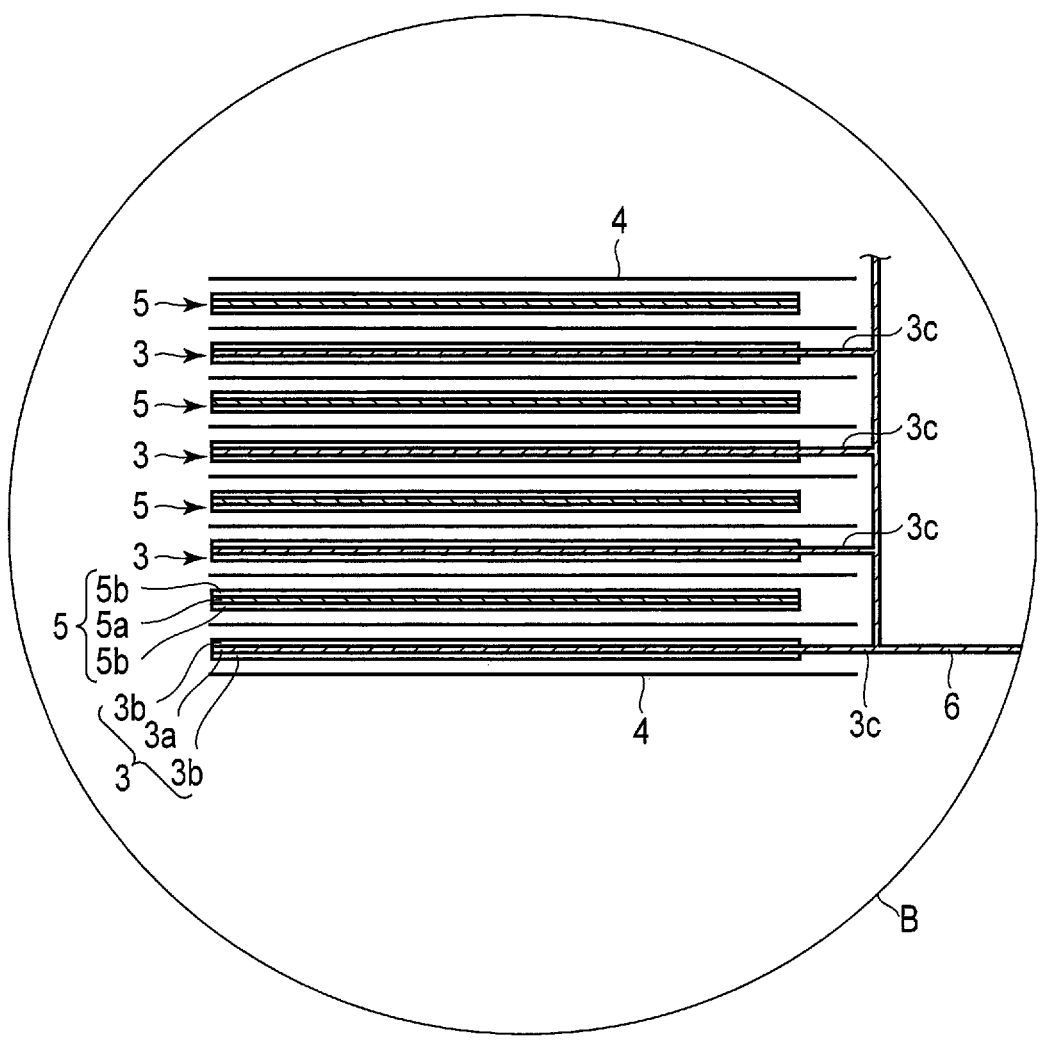
FIG. 7 is an enlarged cross-sectional view of section B of the secondary battery shown in FIG. 6.

FIG. 6 is a partially cut-out perspective view schematically showing another example of a secondary battery according to the embodiment. FIG. 7 is an enlarged cross-sectional view of section B of the secondary battery shown in FIG. 6. FIG. 6 and FIG. 7 show an example of the secondary battery 100 used a laminated film container as a container.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 7, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3 c), the positive electrode tab does not overlap the negative electrode 3.

Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the embodiment includes the electrode group according to the embodiment. Hence, the secondary battery according to the embodiment has the low internal resistance and the excellent charge and discharge efficiency.

Fourth Embodiment

According to an embodiment, a battery module is provided. The battery module according to the embodiment includes plural secondary batteries according to the embodiment.

In the battery module according to the embodiment, each of the single batteries may be arranged electrically connected in series, in parallel, or in a combination of in-series connection and in-parallel connection.

An example of the battery module according to the embodiment will be described next with reference to the drawings.

FIG. 8 is a perspective view schematically showing an example of the battery module according to the embodiment. A battery module 200 shown in FIG. 8 includes five single-batteries 100a to 100e, four bus bars 21, a positive electrode-side lead 22, and a negative electrode-side lead 23. Each of the five single-batteries 100a to 100e is a secondary battery according to the embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 8 is a battery module of five in-series connection. In the battery module including a plurality of the single-batteries which are electrically connected in parallel, the plurality of the single-batteries can be electrically connected to each other, by, for example, connecting a plurality of the negative electrode terminals to each other via a bus bar and connecting a plurality of the positive electrode terminals to each other via a bus bar, which is not illustrated though.

A positive electrode terminal 7 of at least one cell among five single-batteries 100*a* to 100*e* is electrically connected to a positive electrode lead 22 for external connection. Further, a negative electrode terminal 6 of at least one cell among the five single-batteries 100*a* to 100*e* is electrically connected to a negative electrode lead 23 for external connection.

The battery module according to the embodiment includes the secondary battery according to the embodiment. Hence, the battery module according to the embodiment has the low internal resistance and the excellent charge and discharge efficiency.

Fifth Embodiment

According to an embodiment, a battery pack is provided. The battery pack includes a battery module according to the embodiment. The battery pack may include a single secondary battery according to the embodiment, in place of the battery module according to the embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the embodiment will be described with reference to the drawings.

Figure 9:
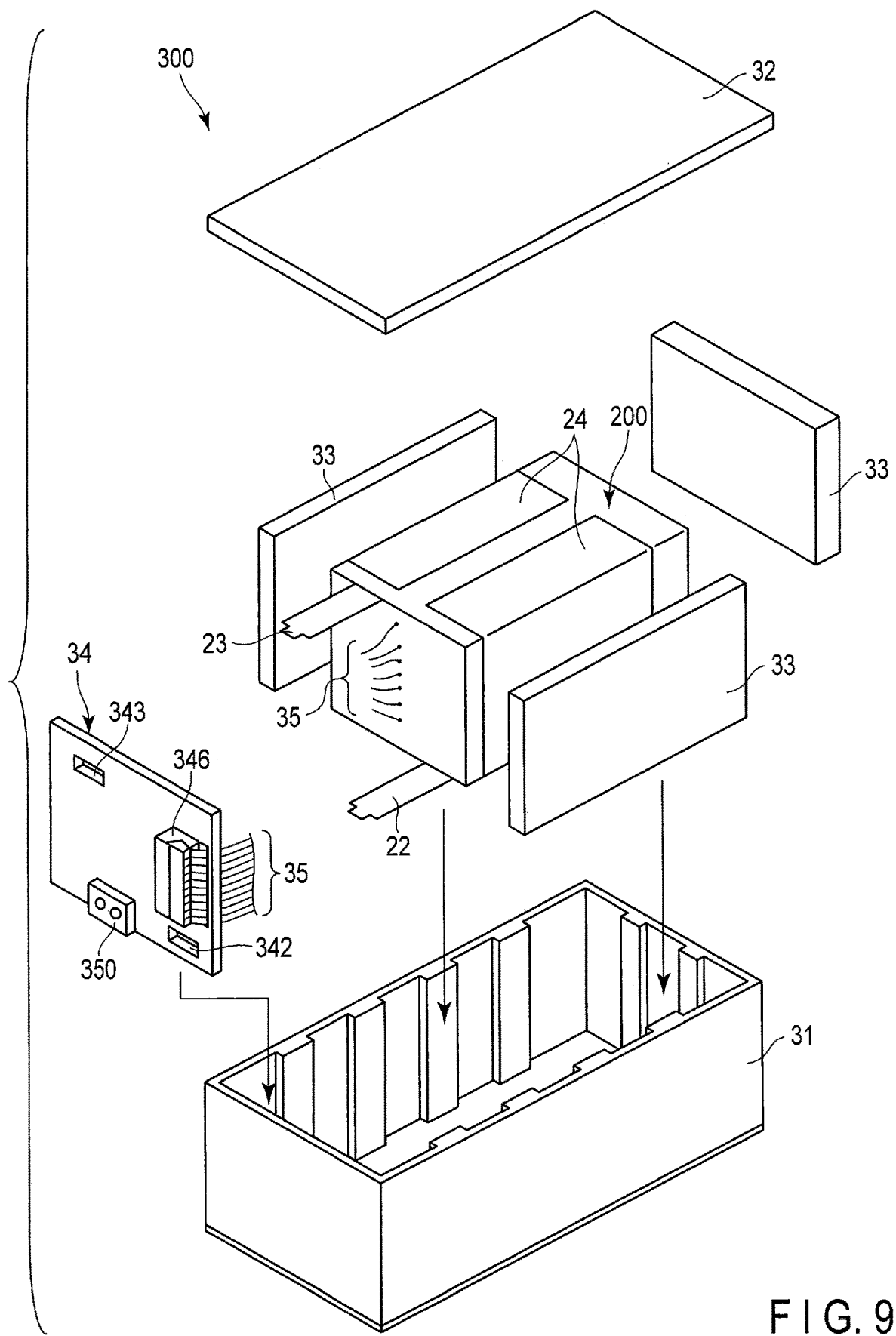
FIG. 9 is an exploded perspective view schematically showing an example of the battery pack according to the embodiment.

FIG. 9 is an exploded perspective view schematically showing an example of the battery pack according to the embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of, the battery module 200, and the heat-shrinkable tape is wound around the battery module 200 and protective sheets 33. After that, the heat-shrinkable tape is shrunk by heating to bundle the plural single-batteries 100.

An end of the positive electrode-side lead 22 is connected to the battery module 200. The end of the positive electrode-side lead 22 is electrically connected to a positive electrode of one or more of the single-batteries 100. An end of the negative electrode-side lead 23 is connected to the battery module 200. The end of the negative electrode-side lead 23 is electrically connected to a negative electrode of one or more of the single-batteries 100.

A printed wiring board 34 is disposed on the one inner surface along the short-side direction of inner surfaces of the housing container 31. The printed wiring board 34 includes a positive electrode-side connector 342, a negative electrode-side connector 343, a thermistor 345, a protective circuit 346, wirings 342*a* and 343*a*, an external power distribution terminal 350, a plus-side (positive-side) wire 348*a*, and a minus-side (negative-side) wire 348*b*. One main surface of the printed wiring board 34 faces one side surface of the battery module 200. An insulating plate (not shown) is disposed in between the printed wiring board 34 and the battery module 200.

To the positive electrode-side connector 342, other end 22*a* of the positive electrode-side lead 22 is electrically connected. To the negative electrode-side connector 343, other end 23*a* of the negative electrode-side lead 23 is electrically connected.

The thermistor 345 is fixed to one main surface of the printed wiring board 34. The thermistor 345 detects the temperature of each single-battery 100 and transmits detection signals to the protective circuit 346.

The external power distribution terminal 350 is fixed to the other main surface of the printed wiring board 34. The external power distribution terminal 350 is electrically connected to device(s) that exists outside the battery pack 300. The external power distribution terminal 350 includes positive-side terminal 352 and negative-side terminal 353.

The protective circuit 346 is fixed to the other main surface of the printed wiring board 34. The protective circuit 346 is connected to the positive-side terminal 352 via the plus-side wire 348*a*. The protective circuit 346 is connected to the negative-side terminal 353 via the minus-side wire 348*b*. In addition, the protective circuit 346 is electrically connected to the positive electrode-side connector 342 via the wiring 342*a*. The protective circuit 346 is electrically connected to the negative electrode-side connector 343 via the wiring 343*a*. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction, facing the printed wiring board 34 across the battery module 200 positioned therebetween. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external devices, based on detection signals transmitted from the thermistor 345 or detection signals transmitted from each single-battery 100 or the battery module 200.

An example of the detection signal transmitted from the thermistor 345 is a signal indicating that the temperature of the single-battery (single-batteries) 100 is detected to be a predetermined temperature or more. An example of the detection signal transmitted from each single-battery 100 or the battery module 200 is a signal indicating detection of over charge, over discharge, and overcurrent of the single-battery (single-batteries) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used respectively as a positive-side terminal 352 and a negative-side terminal 353 of the external power distribution terminal 350.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the embodiment includes the secondary battery according to the embodiment or the battery module according to the embodiment. Hence, the battery pack according to the embodiment has the low internal resistance and the excellent charge and discharge efficiency.

Sixth Embodiment

According to an embodiment, a vehicle is provided. The battery pack according to the embodiment is installed on this vehicle.

In the vehicle according to the embodiment, the battery pack is configured, for example, to recover regenerative energy from motive force of the vehicle. The vehicle may include a mechanism for converting kinetic energy of this vehicle into regenerative energy (Regenerator).

Examples of the vehicle according to the embodiment include two- to four-wheeled hybrid electric automobiles, two- to four-wheeled electric automobiles, electric assist bicycles, and railway cars.

In the vehicle according to the embodiment, the installing position of the battery pack is not particularly limited. For example, the battery pack may be installed in the engine compartment of the vehicle, in rear parts of the vehicle, or under seats.

The vehicle according to the embodiment may be equipped with a plurality of the battery packs. In this case, batteries included in the respective battery packs may be electrically connected to each other in series, may be electrically connected to each other in parallel, or may be electrically connected to each other by a combination of series connections and parallel connections. For example, in a case where each battery pack includes a battery module, the battery modules may be electrically connected to each other in series, may be electrically connected to each other in parallel, or may be electrically connected to each other by a combination of series connections and parallel connections. Alternatively, in a case where each battery pack includes a single battery, the respective batteries may be electrically connected to each other in series, may be electrically connected in parallel, or may be electrically connected to each other by a combination of series connections and parallel connections.

An example of the vehicle according to the embodiment is explained below, with reference to the drawings.

FIG. 11 is a partial perspective view that schematically illustrates an example of the vehicle according to the embodiment.

A vehicle 400, shown in FIG. 11 includes a vehicle body 40 and a battery pack 300 according to the embodiment. In FIG. 11, the vehicle 400 is a four-wheeled automobile.

This vehicle 400 may have plural battery packs 300 installed. In such a case, the batteries (for example, single battery or battery module) included in the battery packs 300 may be connected in series, connected in parallel, or connected in a combination of in-series connection and in-parallel connection.

An example is shown in FIG. 11, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

The vehicle according to the embodiment is equipped with the battery pack according to the embodiment. Hence, the vehicle according to the embodiment is superior in both of safety and travelling performance.

Seventh Embodiment

According to an embodiment, a stationary power supply is provided. The stationary power supply includes a battery pack according to the embodiment. Note that instead of a battery pack according to the embodiment, the stationary power supply may have the battery module according to the embodiment or the secondary battery according to the embodiment installed therein. The stationary power supply according to the embodiment can implement a long life.

Figure 12:
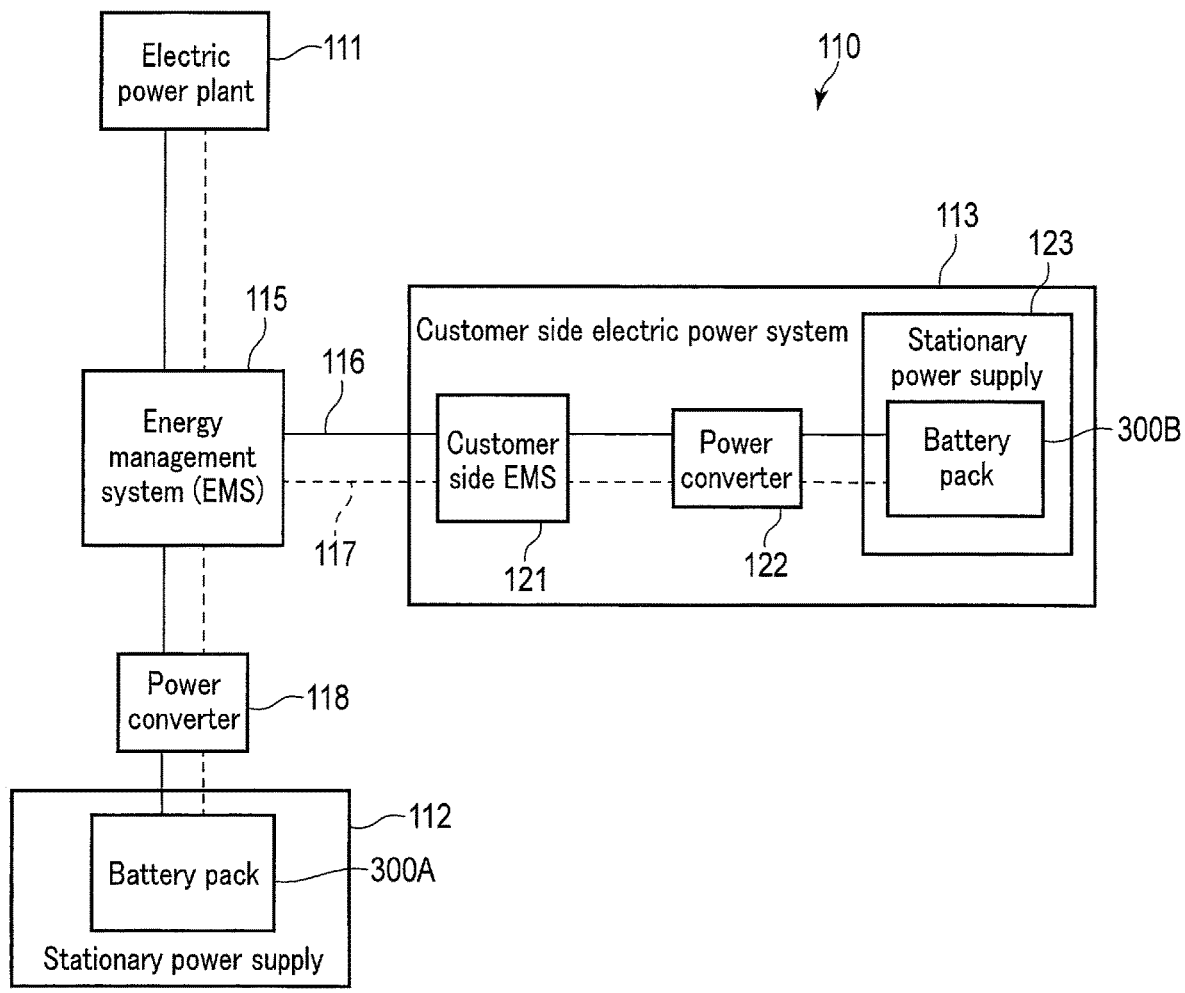
FIG. 12 is a block diagram showing an example of a system including a stationary power supply according to the embodiment.

FIG. 12 is a block diagram showing an example of a system including a stationary power supply according to the embodiment. FIG. 12 is a diagram showing an application example to stationary power supplies 112, 123 as an example of use of battery packs 300A, 300B according to the embodiment. In the example shown in FIG. 12, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel, sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric vehicle. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Example 1

The composite membrane 53 illustrated in FIG. 1 and FIG. 2 was manufactured by the following method. First, cellulose-based nonwoven fabric having a thickness of 15 μm was prepared as the substrate layer 530. Next, the inorganic solid particles 531a and the polymeric material 531b were mixed with N-methyl-2-pyrrolidone (NMP) to obtain a slurry for first and second composite layers formation. LATP ($Li_{1.5}Al_{0.5}Ti_{1.5}(PO_4)_3$) was used as the inorganic solid particles 531a, and polyvinyl butyral was used as the polymeric material 531b. The softening point of polyvinyl butyral was 120° C. In the slurry, the mass ratio of the inorganic solid particles 531a to the polymeric material 531b was set to 88:12. This slurry was applied on one main surface S1 of the substrate layer 530 by a doctor blade method, and the coating film obtained was dried at a temperature of 120° C. A coating film was formed on the other main surface S2 of the substrate layer 530 and dried by a similar method. In this manner, a laminate in which a coating film was provided on both main surfaces S1 and S2 of the substrate layer 530 was obtained.

Next, this laminate was subjected to a roll press treatment. At the time of the roll press treatment, a press apparatus equipped with two rollers up and down was used. The heating temperature of the roller which was located on the upper side and was in contact with the coating film provided on one main surface Si of the substrate layer 530 was set to 130° C., and the roller which was located on the lower side and was in contact with the coating film provided on the other main surface S2 of the substrate layer 530 was not heated but was kept at room temperature (25° C.). The press pressure of each roller was set to 10 kN. A composite membrane 53 was thus obtained in which the first composite layer 531 was provided on one main surface S1 of the substrate layer 530 and the second composite layer 532 was provided on the other main surface S2. The thicknesses $T_{C1}$ and $T_{C2}$ of the first composite layer 531 and second composite layer 532 were each 15 μm.

Example 2

A composite membrane 53 was manufactured by a similar method to that in Example 1 except that the heating temperature of the roller located on the upper side was set to 150° C. and the press pressure of each roller was set to 1 kN.

Example 3

A composite membrane 53 was manufactured by a similar method to that in Example 1 except that the mass ratio of the inorganic solid particles 531a to the polymeric material 531*b* in the slurry was set to 97:3, the heating temperature of the roller located on the upper side was set to 110° C., and the press pressure of each roller was set to 1 kN.

Example 4

A composite membrane 53 was manufactured by a similar method to that in Example 1 except that alumina ($Al_2O_3$) was used instead of LATP.

Example 5

A composite membrane 53 was manufactured by a similar method to that in Example 1 except that LLZ ($Li_7La_3Zr_2O_{12}$) was used instead of LATP.

Example 6

A composite membrane 53 was manufactured by a similar method to that in Example 1 except that one having a mass ratio of the inorganic solid particles to the polymeric material of 88:12 was used as the slurry for first composite layer 531 formation and one having a mass ratio of the inorganic solid particles to the polymeric material of 85:15 was used as the slurry for second composite layer 532 formation.

Example 7

A composite membrane 53 was manufactured by a similar method to that in Example 1 except that one having a mass ratio of the inorganic solid particles to the polymeric material of 88:12 was used as the slurry for first composite layer 531 formation and one having a mass ratio of the inorganic solid particles to the polymeric material of 90:10 was used as the slurry for second composite layer 532 formation.

Example 8

A composite membrane 53 was manufactured by a similar method to that in Example 1 except that the thicknesses $T_{C1}$ and $T_{C2}$ of the first composite layer 531 and second composite layer 532 were each set to 30 μm.

Example 9

A composite membrane 53 was manufactured by a similar method to that in Example 1 except that polyvinyl formal was used instead of polyvinyl butyral as a polymeric material. The softening point of polyvinyl formal was 130° C.

Example 10

A composite membrane 53 was manufactured by a similar method to that in Example 1 except that PVdF was used instead of polyvinyl butyral as a polymeric material and the heating temperature of the roller located on the upper side was set to 140° C. The softening point of PVdF was 140° C.

Example 11

A composite membrane 53 was manufactured by a similar method to that in Example 1 except that the heating temperature of the rollers located on both sides was set to 150° C. and the press pressure of each roller was set to 1 kN.

Example 12

A composite membrane 53 was manufactured by a similar method to that in Example 1 except that the heating temperature of the roller located on the lower side was set to 130° C.

Example 13

A composite membrane 53 was manufactured by a similar method to that in Example 1 except that one having a mass ratio of the inorganic solid particles to the polymeric material of 90:10 was used as the slurry for first composite layer 531 and second composite layer 532 formation and the heating temperature of the roller located on the lower side was set to 130° C.

Example 14

A composite membrane 53 was manufactured by a similar method to that in Example 1 except that the heating temperature of the roller located on the lower side was set to 110° C.

Example 15

A composite membrane 53 was manufactured by a similar method to that in Example 1 except that the heating temperature of the roller located on the upper side was set to 110° C. and the heating temperature of the roller located on the lower side was set to 130° C.

Example 16

A composite membrane 53 was manufactured by a similar method to that in Example 1 except that the first composite layer 531 and the second composite layer 532 each had a two-layer structure and the roller located on the upper side was not heated but was kept at normal temperature (25° C.).

Specifically, as the slurry for forming the lower layer of the first composite layer 531 and second composite layer 532, one having a mass ratio of the inorganic solid particles to the polymeric material of 90:10 was prepared. As the slurry for forming the upper layer of the first composite layer 531 and second composite layer 532, one having a mass ratio of the inorganic solid particles to the polymeric material of 80:20 was prepared. The slurry for lower layer formation was applied on one main surface S1 of the substrate layer 530, the coating film was dried, then the slurry for upper layer formation was applied thereon, and the coating film was dried. The slurry for lower layer formation was applied on other main surface S2 of the substrate layer 530, the coating film was dried, then the slurry for upper layer formation was applied thereon, and the coating film was dried in the same manner. A laminate including a coating film having a two-layer structure of an upper layer and a lower layer on both surfaces of the substrate layer 530 was thus obtained. This laminate was subjected to a press treatment at normal temperature. The thicknesses of the upper layer and lower layer were each set to 8 μm.

Comparative Example 1

A composite membrane 53 was manufactured by a similar method to that in Example 1 except that the heating temperature of each roller was set to 50° C. and the press pressure of each roller was set to 1 kN.

Comparative Example 2

A composite membrane 53 was manufactured by a similar method to that in Example 1 except that one having a mass ratio of the inorganic solid particles to the polymeric material of 70:30 was used as the slurry for first composite layer 531 and second composite layer 532 formation and the heating temperature of each roller was set to 50° C.

<Measurement of Density>

The composite membranes 53 according to Examples 1 to 16 and Comparative Examples 1 and 2 were subjected to the measurement of the first density $FD_{C1}$, the second density $SD_{C1}$, the first density $FD_{C2}$, and the second density $SD_{C2}$ by the methods described above. The respective densities are presented in Table 3.

<Measurement of Coefficient of Air Permeability>

The composite membranes 53 according to Examples 1 to 16 and Comparative Examples 1 and 2 were subjected to the measurement of the coefficient of air permeability by the method described above. The results are presented in Table 3.

The composition of the first composite layer 531 of the composite membranes 53 according to Examples 1 to 16 and Comparative Examples 1 and 2 are summarized in the following Table 1.

TABLE 1

| | Inorganic solid particles | | Polymeric material | | | Thickness (μm) |
|---|---|---|---|---|---|---|
| | Types | Mass (%) | Types | Softening point (° C.) | Mass (%) | |
| Example 1 | LATP | 88 | Polyvinyl butyral | 120 | 12 | 15 |
| Example 2 | LATP | 88 | Polyvinyl butyral | 120 | 12 | 15 |
| Example 3 | LATP | 97 | Polyvinyl butyral | 120 | 3 | 15 |
| Example 4 | Al$_2$O$_3$ | 88 | Polyvinyl butyral | 120 | 12 | 15 |
| Example 5 | LLZ | 88 | Polyvinyl butyral | 120 | 12 | 15 |
| Example 6 | LATP | 88 | Polyvinyl butyral | 120 | 12 | 15 |
| Example 7 | LATP | 88 | Polyvinyl butyral | 120 | 12 | 15 |
| Example 8 | LATP | 88 | Polyvinyl butyral | 120 | 12 | 30 |
| Example 9 | LATP | 88 | Polyvinyl formal | 130 | 12 | 15 |
| Example 10 | LATP | 88 | PVdF | 140 | 12 | 15 |
| Example 11 | LATP | 88 | Polyvinyl butyral | 120 | 12 | 15 |
| Example 12 | LATP | 88 | Polyvinyl butyral | 120 | 12 | 15 |
| Example 13 | LATP | 90 | Polyvinyl butyral | 120 | 10 | 15 |
| Example 14 | LATP | 88 | Polyvinyl butyral | 120 | 12 | 15 |
| Example 15 | LATP | 88 | Polyvinyl butyral | 120 | 12 | 15 |
| Example 16 | LATP | 80 | Polyvinyl butyral | 120 | 20 | 8 |
| | LATP | 90 | Polyvinyl butyral | 120 | 10 | 8 |
| Comparative Example 1 | LATP | 88 | Polyvinyl butyral | 120 | 12 | 15 |
| Comparative Example 2 | LATP | 70 | Polyvinyl butyral | 120 | 30 | 15 |

The composition of the second composite layer 532 of the composite membranes 53 according to Examples 1 to 16 and Comparative Examples 1 and 2 are summarized in the following Table 2.

TABLE 2

| | Inorganic solid particles | | Polymeric material | | | Thickness (μm) |
|---|---|---|---|---|---|---|
| | Types | Mass (%) | Types | Softening point (° C.) | Mass (%) | |
| Example 1 | LATP | 88 | Polyvinyl butyral | 120 | 12 | 15 |
| Example 2 | LATP | 88 | Polyvinyl butyral | 120 | 12 | 15 |
| Example 3 | LATP | 97 | Polyvinyl butyral | 120 | 3 | 15 |
| Example 4 | Al$_2$O$_3$ | 88 | Polyvinyl butyral | 120 | 12 | 15 |
| Example 5 | LLZ | 88 | Polyvinyl butyral | 120 | 12 | 15 |
| Example 6 | LATP | 85 | Polyvinyl butyral | 120 | 15 | 15 |
| Example 7 | LATP | 90 | Polyvinyl butyral | 120 | 10 | 15 |
| Example 8 | LATP | 88 | Polyvinyl butyral | 120 | 12 | 30 |
| Example 9 | LATP | 88 | Polyvinyl formal | 130 | 12 | 15 |
| Example 10 | LATP | 88 | PVdF | 140 | 12 | 15 |
| Example 11 | LATP | 88 | Polyvinyl butyral | 120 | 12 | 15 |
| Example 12 | LATP | 88 | Polyvinyl butyral | 120 | 12 | 15 |
| Example 13 | LATP | 90 | Polyvinyl butyral | 120 | 10 | 15 |
| Example 14 | LATP | 88 | Polyvinyl butyral | 120 | 12 | 15 |
| Example 15 | LATP | 88 | Polyvinyl butyral | 120 | 12 | 15 |
| Example 16 | LATP | 80 | Polyvinyl butyral | 120 | 20 | 8 |
| | LATP | 90 | Polyvinyl butyral | 120 | 10 | 8 |
| Comparative Example 1 | LATP | 88 | Polyvinyl butyral | 120 | 12 | 15 |
| Comparative Example 2 | LATP | 70 | Polyvinyl butyral | 120 | 30 | 15 |

The manufacturing methods and measurement results of the composite membranes 53 according to Examples 1 to 16 and Comparative Examples 1 and 2 are summarized in the following Table 3.

TABLE 3

| | Press temperature (° C.) | | press pressure (kN) | $SD_{C1}$ | $FD_{C1}$ | $SD_{C1}/FD_{C1}$ | $SD_{C2}$ | $FD_{C2}$ | $SD_{C2}/FD_{C2}$ | coefficient of air permeability ($\times 10^{-17}$ m$^2$) |
|---|---|---|---|---|---|---|---|---|---|---|
| | First composite layer | Second Composite layer | | | | | | | | |
| Example 1 | 130 | 25 | 10 | 98 | 93 | 1.05 | 93 | 93 | 1.00 | 3.5 |
| Example 2 | 150 | 25 | 1 | 99 | 50 | 1.98 | 50 | 50 | 1.00 | 2.9 |
| Example 3 | 110 | 25 | 1 | 85 | 45 | 1.89 | 45 | 45 | 1.00 | 950 |
| Example 4 | 130 | 25 | 10 | 96 | 88 | 1.09 | 88 | 88 | 1.00 | 8.1 |
| Example 5 | 130 | 25 | 10 | 97 | 91 | 1.07 | 91 | 91 | 1.00 | 5.3 |
| Example 6 | 130 | 25 | 10 | 98 | 93 | 1.05 | 95 | 95 | 1.00 | 3.4 |
| Example 7 | 130 | 25 | 10 | 98 | 93 | 1.05 | 90 | 90 | 1.00 | 3.7 |
| Example 8 | 130 | 25 | 10 | 98 | 93 | 1.05 | 93 | 93 | 1.00 | 2.5 |
| Example 9 | 130 | 25 | 10 | 98 | 93 | 1.05 | 93 | 93 | 1.00 | 4.3 |

TABLE 3-continued

|  | Press temperature (° C.) | | press pressure (kN) | $SD_{C1}$ | $FD_{C1}$ | $SD_{C1}/FD_{C1}$ | $SD_{C2}$ | $FD_{C2}$ | $SD_{C2}/FD_{C2}$ | coefficient of air permeability ($\times 10^{-17}$ m$^2$) |
|---|---|---|---|---|---|---|---|---|---|---|
|  | First composite layer | Second Composite layer | | | | | | | | |
| Example 10 | 140 | 25 | 10 | 98 | 93 | 1.05 | 93 | 93 | 1.00 | 5.1 |
| Example 11 | 150 | 150 | 1 | 99 | 50 | 1.98 | 99 | 50 | 1.98 | 630 |
| Example 12 | 130 | 130 | 10 | 98 | 93 | 1.05 | 98 | 93 | 1.05 | 0.8 |
| Example 13 | 130 | 130 | 10 | 97 | 90 | 1.08 | 97 | 90 | 1.08 | 1.5 |
| Example 14 | 130 | 110 | 10 | 98 | 93 | 1.05 | 96 | 93 | 1.03 | 1.5 |
| Example 15 | 110 | 130 | 10 | 96 | 93 | 1.03 | 98 | 93 | 1.05 | 1.5 |
| Example 16 | 25 | 25 | 10 | 98 | — | 1.09 | 98 | — | 1.09 | 2.2 |
|  |  |  |  | — | 90 |  | — | 90 |  |  |
| Comparative Example 1 | 50 | 50 | 1 | 50 | 50 | 1.00 | 50 | 50 | 1.00 | 1030 |
| Comparative Example 2 | 50 | 50 | 10 | 98 | 98 | 1.00 | 98 | 98 | 1.00 | 0.9 |

In Table 3, in the columns noted as "first composite layer" and "second composite layer" in the column below the heading "press temperature", the heating temperature of the roller located on the upper side and the heating temperature of the roller located on the lower side are described, respectively. In the column noted as "press pressure", the press pressure of the respective rollers on the upper side and lower side is described.

In the columns noted as "$SD_{C1}$", "$FD_{C1}$", and "$SD_{C1}/FD_{C1}$", the second density $SD_{C1}$ on the second main surface $SS_{C1}$ side of the first composite layer, the first density $FD_{C1}$ on the first main surface $FS_{C1}$ side of the first composite layer, and the ratio $SD_{C1}/FD_{C1}$ of the second density $SD_{C1}$ to the first density $FD_{C1}$ are described, respectively. In the columns noted as "$SD_{C2}$", "$FD_{C2}$", and "$SD_{C2}/FD_{C2}$", the second density $SD_{C2}$ on the second main surface $SS_{C2}$ side of the second composite layer, the first density $FD_{C2}$ on the first main surface $FS_{C2}$ side of the second composite layer, and the ratio $SD_{C2}/FD_{C2}$ of the second density $SD_{C2}$ to the first density $FD_{C2}$ are described, respectively. In the column noted as "coefficient of air permeability", the coefficient of air permeability of the composite membrane 53 is described.

(Fabrication of Secondary Battery According to Example EB1)

First, a positive electrode active material, a conductive agent, a binder, and a solvent were mixed together to prepare a slurry for positive electrode fabrication. LiMn$_2$O$_4$ was used as the positive electrode active material. Graphite powder was used as the conductive agent. PVdF was used as the binder. N-methyl-2-pyrrolidone (NMP) was used as the solvent. The mass ratio of the positive electrode active material to the conductive agent and the binder in the slurry was set to 80:10:10. This slurry was applied on both surfaces of the positive electrode current collector, dried, and then subjected to a press treatment to obtain a positive electrode. A Ti foil having a thickness of 12 μm was used as the positive electrode current collector.

Next, a negative electrode active material, a conductive agent, a binder, and a solvent were mixed together to prepare a slurry for negative electrode fabrication. Li$_4$Ti$_5$O$_{12}$ was used as the negative electrode active material. Graphite powder was used as the conductive agent. PVdF was used as the binder. N-methyl-2-pyrrolidone (NMP) was used as the solvent. The mass ratio of the negative electrode active material to the conductive agent and the binder in the slurry was set to 90:5:5. This slurry was applied on both surfaces of the negative electrode current collector, dried, and then subjected to a press treatment to obtain a negative electrode. A Zn foil having a thickness of 20 μm was used as the negative electrode current collector.

Next, an electrolyte salt and water were mixed together to prepare an aqueous electrolyte. Lithium chloride was used as the electrolyte salt. The concentration of the electrolyte salt in the aqueous electrolyte was set to 10 mol/L.

The positive electrode, the first separator, the negative electrode, and the second separator were stacked in this order to obtain a stacked body. The composite membrane 53 according to Example 1 was used as the first and second separators. At this time, the separator was disposed so that the first composite layer was located on the negative electrode side and the second composite layer was located on the positive electrode side. The stacked body was spirally wound so that the negative electrode was located at the outermost periphery, and then pressed to fabricate a flat electrode group. The electrode group obtained was housed in a metal can, and the aqueous electrolyte was injected into the metal can to fabricate a secondary battery.

(Fabrication of Secondary Batteries According to Examples EB2 to EB16 and Comparative Examples CB1 and CB2)

Secondary batteries according to Examples EB2 to EB16 and Comparative Examples CB1 and CB2 were fabricated by a similar method to that in Example EB1 except that the composite membranes 53 according to Examples 2 to 16 and Comparative Examples 1 and 2 were respectively used as separators.

(Fabrication of Example EB17)

A secondary battery according to Example EB17 was fabricated by a similar method to that in Example EB1 except that Nb$_2$TiO$_7$ was used instead of Li$_4$Ti$_5$O$_{12}$ as the negative electrode active material.

(Fabrication of Example EB18)

A secondary battery according to Example EB18 was fabricated by a similar method to that in Example EB1 except that LiCoO$_2$ was used instead of LiMn$_2$O$_4$ as the positive electrode active material.

<Measurement of Internal Resistance>

First, the state of charge (SOC) of the secondary batteries according to Examples EB1 to EB18 and Comparative Examples CB1 and CB2 was adjusted to 50%. The adjusted battery was pulse-discharged at a rate of 10 C, and the discharge voltage after 10 seconds was measured. The internal resistance of each battery was calculated from the voltage before discharge and the discharge voltage at 10 C. The results are presented in Table 4.

<Measurement of Charge and Discharge Efficiency and Capacity>

The secondary batteries according to Examples EB1 to EB18 and Comparative Examples CB1 and CB2 were subjected to the measurement of charge and discharge efficiency. Specifically, each secondary battery was first charged at a constant current of 5 Å in an environment of 25° C. until the battery voltage reached 2.8 V. This state was maintained for 30 minutes. Thereafter, the battery was discharged at a constant current of 5 Å until the battery voltage reached 2.1 V. This state was maintained for 30 minutes. This series of operations were taken as one charge and discharge cycle, and this was repeated 50 times. The discharge capacity and charge capacity of the secondary battery after 50 cycles were measured, and the charge and discharge efficiency (discharge capacity/charge capacity) was calculated. The results are presented in Table 4.

The characteristics of the secondary batteries according to Examples EB1 to EB18 and Comparative Examples CB1 and CB2 are summarized in the following Table 4.

charge and discharge efficiency and discharge capacity of the secondary batteries of Comparative Examples CB1 and CB2 including the separators of Comparative Examples 1 and 2 in which the ratio $SD_{C1}/FD_{C1}$ was 1.00. This is considered to be because the separators according to Examples 1 to 16 exhibit high water shielding property and high ion conductivity.

The separator of Comparative Example 1 is considered to exhibit low water shielding property since the first density $FD_{C1}$ and second density $SD_{C1}$ of the first composite layer are both low. For this reason, it is considered that the internal resistance of the secondary battery of Comparative Example CB1 was low but the decomposition of the aqueous electrolyte occurred, thus the charge and discharge efficiency decreased and a sufficient discharge capacity was not acquired. In addition, the separator of Comparative Example 2 is considered to exhibit low ion conductivity since the first density $FD_{C1}$ and second density $SD_{C1}$ of the first composite layer are both high. For this reason, it is considered that the internal resistance of the secondary battery of Comparative Example CB2 was high and the charge and discharge efficiency and the discharge capacity decreased.

TABLE 4

| | Positive electrode | Negative electrode | Separator | Resistance (mΩ) | Charge and discharge efficiency (%) | Discharge capacity (mAh/g) |
|---|---|---|---|---|---|---|
| Example EB1 | $LiMn_2O_4$ | $Li_4T_5O_{12}$ | Example 1 | 381 | 88 | 148 |
| Example EB2 | $LiMn_2O_4$ | $Li_4T_5O_{12}$ | Example 2 | 278 | 80 | 136 |
| Example EB3 | $LiMn_2O_4$ | $Li_4T_5O_{12}$ | Example 3 | 161 | 75 | 130 |
| Example EB4 | $LiMn_2O_4$ | $Li_4T_5O_{12}$ | Example 4 | 502 | 72 | 125 |
| Example EB5 | $LiMn_2O_4$ | $Li_4T_5O_{12}$ | Example 5 | 455 | 85 | 144 |
| Example EB6 | $LiMn_2O_4$ | $Li_4T_5O_{12}$ | Example 6 | 462 | 79 | 135 |
| Example EB7 | $LiMn_2O_4$ | $Li_4T_5O_{12}$ | Example 7 | 193 | 73 | 130 |
| Example EB8 | $LiMn_2O_4$ | $Li_4T_5O_{12}$ | Example 8 | 753 | 74 | 112 |
| Example EB9 | $LiMn_2O_4$ | $Li_4T_5O_{12}$ | Example 9 | 406 | 89 | 148 |
| Example EB10 | $LiMn_2O_4$ | $Li_4T_5O_{12}$ | Example 10 | 669 | 75 | 129 |
| Example EB11 | $LiMn_2O_4$ | $Li_4T_5O_{12}$ | Example 11 | 187 | 78 | 133 |
| Example EB12 | $LiMn_2O_4$ | $Li_4T_5O_{12}$ | Example 12 | 150 | 91 | 160 |
| Example EB13 | $LiMn_2O_4$ | $Li_4T_5O_{12}$ | Example 13 | 118 | 93 | 161 |
| Example EB14 | $LiMn_2O_4$ | $Li_4T_5O_{12}$ | Example 14 | 196 | 88 | 155 |
| Example EB15 | $LiMn_2O_4$ | $Li_4T_5O_{12}$ | Example 15 | 247 | 87 | 155 |
| Example EB16 | $LiMn_2O_4$ | $Li_4T_5O_{12}$ | Example 16 | 218 | 82 | 139 |
| Example EB17 | $LiMn_2O_4$ | $Nb_2TiO_7$ | Example 1 | 576 | 88 | 146 |
| Example EB18 | $LiCoO_2$ | $Li_4T_5O_{12}$ | Example 1 | 371 | 86 | 141 |
| Comparative Example CB1 | $LiMn_2O_4$ | $Li_4T_5O_{12}$ | Comparative Example 1 | 113 | 23 | 21 |
| Comparative Example CB2 | $LiMn_2O_4$ | $Li_4T_5O_{12}$ | Comparative Example 2 | 2800 | 56 | 88 |

In Table 4, the kind of positive electrode active material is described in the column noted as "positive electrode". In addition, the kind of negative electrode active material is described in the column noted as "negative electrode". The kind of separator is described in the column noted as "separator". The internal resistance of the secondary battery is described in the column noted as "resistance". A value acquired by dividing the discharge capacity after the 50-cycle test by the charge capacity is described in the column noted as "charge and discharge efficiency". The discharge capacity after the 50-cycle test is described in the column noted as "discharge capacity (mAh/g)".

As is apparent from Tables 1 to 4, the charge and discharge efficiency and discharge capacity of the secondary batteries of Examples EB1 to EB18 including the separators of Examples 1 to 16 in which the ratio $SD_{C1}/FD_{C1}$ of the second density $SD_{C1}$ to the first density $FD_{C1}$ of the first composite layer was 1.03 or more were higher than the As is apparent from the comparison of Examples 1, 4, and 5 and Examples EB1, EB4, and EB5 with each other, excellent battery characteristics were realized even when separators in which the kind of inorganic solid particles was changed were used. In addition, as is apparent from the comparison of Examples 1, 9, and 10 and Examples EB1, EB9, and EB10 with each other, excellent battery characteristics were realized even when separators in which the kind of polymeric material was changed were used. In addition, as is apparent from the comparison of Examples EB1, EB17, and EB18 with each other, excellent battery characteristics were realized even when separators in which the kinds of positive electrode active material and negative electrode active material were changed were used.

As presented in Examples 11 to 16 and Examples EB11 to EB16, excellent battery characteristics were realized even when separators in which the ratio $SD_{C2}/FD_{C2}$ of the second density $SD_{C2}$ to the first density $FD_{C2}$ of the second composite layer was 1.03 or more were used.

The separator according to the embodiment described above includes a first composite layer of which the denseness on the surface side is higher than the denseness on the porous side. For this reason, this separator exhibits excellent electrolyte impregnating ability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A separator comprising a composite membrane that includes:
   a substrate layer;
   a first composite layer located on one surface of the substrate layer; and a second composite layer located on the other surface of the substrate layer, wherein the composite membrane has a coefficient of air permeability of $1 \times 10^{-19}$ m$^2$ or more and $1 \times 10^{-16}$ m$^2$ or less,
   the first composite layer and the second composite layer each includes inorganic solid particles and a polymeric material,
   the first composite layer has a first surface in contact with the substrate layer and a second surface located on an opposite side to the first surface,
   denseness of a portion including the first surface in the first composite layer is lower than denseness of a portion including the second surface in the first composite layer, and
   a ratio $SD_{C1}/FD_{C1}$ of a second density $SD_{C1}$ to a first density $FD_{C1}$ is 1.03 or more in the first composite layer, where the first density $FD_{C1}$ of the first composite layer is a proportion occupied by a portion other than holes in a region from the first surface to a surface located at a depth of 0.2 $T_{C1}$ with respect to a thickness $T_{C1}$ of the first composite layer and the second density $S_{C1}$ of the first composite layer is a proportion occupied by a portion other than holes in a region from the second surface to a surface located at a depth of 0.2 $T_{C1}$ with respect to the thickness $T_{C1}$ of the first composite layer.

2. The separator according to claim 1, wherein the second composite layer has a first surface in contact with the substrate layer and a second surface located on an opposite side to the first surface, and
   denseness of a portion including the first surface in the second composite layer is lower than denseness of a portion including the second surface in the second composite layer.

3. The separator according to claim 2, wherein
   a ratio $SD_{C2}/FD_{C2}$ of a first density $FD_{C2}$, to a second density $SD_{c2}$ is 1.03 or more in the second composite layer,
   the first density $FD_{c2}$ of the second composite layer is a proportion occupied by a portion other than holes in a region from the first surface of the second composite layer to a surface located at a depth of 0.2 $T_{c2}$ with respect to a thickness $T_{c2}$ of the second composite layer and the second density $SD_{C2}$ of the second composite layer is a proportion occupied by a portion other than holes in a region from the second surface of the second composite layer to a surface located at a depth of 0.2 $T_{C2}$ with respect to the thickness $T_{C2}$ of the second composite layer.

4. The separator according to claim 1, wherein the substrate layer is a nonwoven fabric or a self-supporting porous membrane.

5. The separator according to claim 1, wherein the inorganic solid particles contain solid electrolyte particles having ion conductivity of an alkali metal ion.

6. The separator according to claim 1, wherein the inorganic solid particles contain at least one compound selected from the group consisting of LATP ($Li_{1+x}Al_xTi_{2-x}(PO_4)_3$), where $0.1 \leq x \leq 0.5$, having a NASICON type skeleton, $Li_{1.5}Al_{0.5}Ge_{1.5}(PO_4)_3$, amorphous LIPON ($Li_{2.9}PO_{3.3}N_{0.46}$), and garnet type LLZ ($Li_7La_3Zr_2O_{12}$).

7. The separator according to claim 1, wherein the polymeric material has a portion formed of a monomer unit containing a hydrocarbon having a functional group containing at least one element selected from the group consisting of oxygen (O), sulfur (S), nitrogen (N), and fluorine (F) and a proportion occupied by the portion formed of a monomer unit is 70 mol % or more.

8. The separator according to claim 7, wherein a functional group of the monomer unit includes at least one selected from the group consisting of a formal group, a butyral group, a carboxymethyl ester group, an acetyl group, a carbonyl group, a hydroxyl group, and a fluoro group.

9. An electrode group comprising:
   a positive electrode containing a positive electrode active material;
   a negative electrode containing a negative electrode active material; and
   the separator according to claim 1, located at least between the positive electrode and the negative electrode.

10. The electrode group according to claim 9, wherein the negative electrode active material contains a compound having a lithium ion insertion/extraction potential of 1 V or more and 3 V or less (vs. Li/Li$^+$) with respect to a potential based on metal lithium.

11. The electrode group according to claim 9, wherein the positive electrode active material contains a compound having a lithium ion insertion/extraction potential of 2.5 V or more and 5.5 V or less (vs. Li/Li$^+$) with respect to a potential based on metal lithium.

12. A secondary battery comprising the electrode group according to claim 9 and an aqueous electrolyte.

13. A battery pack comprising the secondary battery according to claim 12.

14. The battery pack according to claim 13, further comprising:
   an external power distribution terminal; and
   a protective circuit.

15. The battery pack according to claim 13, further comprising plural of the secondary battery, wherein the plural of the secondary battery are electrically connected in series, in parallel, or in combination of series and parallel.

16. A vehicle comprising the battery pack according to claim 13.

17. The vehicle according to claim 16, further comprising a mechanism configured to convert kinetic energy of the vehicle into regenerative energy.

18. A stationary power supply comprising the battery pack according to claim 13.

19. The separator according to claim 1, wherein an upper limit of the ratio $SD_{C1}/FD_{C1}$ is 2.0 or less.

20. The separator according to claim 1, wherein the polymeric material is polyvinyl butyral or polyvinyl formal.

21. A separator comprising a composite membrane that includes:
- a substrate layer;
- a first composite layer located on one surface of the substrate layer; and
- a second composite layer located on the other surface of the substrate layer, wherein
- the composite membrane has a coefficient of air permeability of $1\times10^{-14}$ m$^2$ or less,
- the first composite layer and the second composite layer each includes inorganic solid particles and a polymeric material,
- the first composite layer has a first surface in contact with the substrate layer and a second surface located on an opposite side to the first surface,
- denseness of a portion including the first surface in the first composite layer is lower than denseness of a portion including the second surface in the first composite layer, and
- a ratio $SD_{C1}/FD_{C1}$ of a second density $SD_{C1}$ to a first density $FD_{C1}$ is 1.03 or more in the first composite layer, where the first density $FD_{C1}$ of the first composite layer is a proportion occupied by a portion other than holes in a region from the first surface to a surface located at a depth of 0.2 $T_{C1}$ with respect to a thickness $T_{C1}$ of the first composite layer and the second density $SD_{C1}$ of the first composite layer is a proportion occupied by a portion other than holes in a region from the second surface to a surface located at a depth of 0.2 $T_{C1}$ with respect to the thickness $T_{C1}$ of the first composite layer,
- the polymeric material is polyvinyl butyral or polyvinyl formal.

* * * * *

UNITED STATES PATENT AND TRADEMARK OFFICE
CERTIFICATE OF CORRECTION

| | |
|---|---|
| PATENT NO. | : 11,594,783 B2 |
| APPLICATION NO. | : 16/804489 |
| DATED | : February 28, 2023 |
| INVENTOR(S) | : Yasuyuki Hotta et al. |

It is certified that error appears in the above-identified patent and that said Letters Patent is hereby corrected as shown below:

On the Title Page

Item (73), the Assignee's name is misspelled. Item (73) should read:
--(73) Assignee: KABUSHIKI KAISHA TOSHIBA, Minato-ku (JP)--

Signed and Sealed this
Fourth Day of July, 2023

Katherine Kelly Vidal
*Director of the United States Patent and Trademark Office*